(12) United States Patent
Lyman et al.

(10) Patent No.: US 11,225,381 B2
(45) Date of Patent: *Jan. 18, 2022

(54) VACUUM HOLDER WITH EXTENSIBLE SKIRT GASKET

(71) Applicant: The Procter & Gamble Company, Cincinnati, OH (US)

(72) Inventors: Christopher Robert Lyman, Milford, OH (US); Jason Matthew Orndorff, Lawrenceburg, IN (US); Marcus Shen, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 154 days.

This patent is subject to a terminal disclaimer.

(21) Appl. No.: 16/263,755

(22) Filed: Jan. 31, 2019

(65) Prior Publication Data

US 2019/0161281 A1 May 30, 2019

Related U.S. Application Data

(63) Continuation of application No. 15/698,693, filed on Sep. 8, 2017, now Pat. No. 10,221,017.

(Continued)

(51) Int. Cl.
*B25J 15/06* (2006.01)
*B65G 21/20* (2006.01)
*B25B 11/00* (2006.01)

(52) U.S. Cl.
CPC ........ *B65G 21/2036* (2013.01); *B25B 11/005* (2013.01); *B25J 15/0625* (2013.01); *B65G 2201/0261* (2013.01)

(58) Field of Classification Search
CPC ........ B65G 21/2036; B65G 2201/0261; B25B 11/005; B25J 15/0625; B25J 15/0683
See application file for complete search history.

(56) References Cited

U.S. PATENT DOCUMENTS

| 3,229,953 A | 1/1966 | Muir, Jr. |
| 3,426,884 A | 2/1969 | Donner |

(Continued)

FOREIGN PATENT DOCUMENTS

| CN | 1748943 A | 3/2006 |
| EP | 1837419 A1 | 9/2007 |

OTHER PUBLICATIONS

International Search Report and Written Opinion dated Nov. 20, 2017, 15 pages.

(Continued)

*Primary Examiner* — Dean J Kramer
(74) *Attorney, Agent, or Firm* — Gary J. Foose

(57) ABSTRACT

A vacuum holder for articles, a combination of a vacuum holder and an article, a system for holding and conveying articles, and a method for holding and conveying articles are disclosed. The vacuum holder includes a main body having a surface and an air passageway leading to the surface, and a valve joined to the main body and in fluid communication with the air passageway. The vacuum holder includes an extensible skirt gasket with an opening therein. An article can be placed adjacent to the surface of the main body, and a vacuum can be drawn through the air passageway to hold the article to the vacuum holder. The valve maintains the vacuum between the article and the vacuum holder without being connected to a vacuum source, until it is desired to release the article from the vacuum holder.

9 Claims, 18 Drawing Sheets

Related U.S. Application Data

(60) Provisional application No. 62/385,324, filed on Sep. 9, 2016.

(56) References Cited

U.S. PATENT DOCUMENTS

| | | | |
|---|---|---|---|
| 3,941,237 A | 3/1976 | MacGregor, Jr. | |
| 4,294,424 A * | 10/1981 | Teissier | B25B 11/007 |
| | | | 248/205.9 |
| 4,718,629 A | 1/1988 | Block et al. | |
| 5,154,380 A | 10/1992 | Risca | |
| 5,173,148 A * | 12/1992 | Lisec | B65G 49/061 |
| | | | 156/356 |
| 5,540,409 A | 7/1996 | Cunningham | |
| 5,651,941 A | 7/1997 | Stark et al. | |
| 5,869,139 A | 2/1999 | Biggs et al. | |
| 5,913,104 A | 6/1999 | Piper et al. | |
| 6,011,508 A * | 1/2000 | Perreault | B61L 3/225 |
| | | | 246/122 R |
| 6,101,952 A * | 8/2000 | Thornton | B60L 13/003 |
| | | | 104/130.02 |
| 6,499,701 B1 * | 12/2002 | Thornton | B60L 13/06 |
| | | | 246/194 |
| 6,578,495 B1 * | 6/2003 | Yitts | B60L 13/00 |
| | | | 104/292 |
| 6,781,524 B1 * | 8/2004 | Clark | B61L 25/025 |
| | | | 180/168 |
| 6,917,136 B2 * | 7/2005 | Thornton | H02K 41/031 |
| | | | 310/254.1 |
| 6,983,701 B2 * | 1/2006 | Thornton | B60L 13/06 |
| | | | 104/282 |
| 7,458,454 B2 * | 12/2008 | Mendenhall | B65G 35/06 |
| | | | 198/377.02 |
| 8,813,951 B2 | 8/2014 | Forsthoevel et al. | |
| 9,032,880 B2 | 5/2015 | King et al. | |
| 9,085,420 B2 | 7/2015 | Williams et al. | |
| 9,193,108 B2 | 11/2015 | Seger et al. | |
| 10,221,017 B2 * | 3/2019 | Lyman | B65G 21/2036 |
| 10,442,629 B2 * | 10/2019 | Lyman | B25B 11/005 |
| 2009/0114791 A1 | 5/2009 | Alger | |
| 2012/0018938 A1 * | 1/2012 | Cone | B25B 11/005 |
| | | | 269/21 |
| 2012/0274011 A1 | 11/2012 | Schilp et al. | |
| 2018/0071923 A1 | 3/2018 | Lyman et al. | |
| 2018/0072552 A1 * | 3/2018 | Orndorff | G05D 1/0263 |
| 2018/0076069 A1 * | 3/2018 | Burkhard | B67C 3/24 |
| 2018/0193983 A1 * | 7/2018 | Ishino | H01L 21/6838 |

OTHER PUBLICATIONS

All Office Actions, U.S. Appl. No. 15/698,693 dated Oct. 18, 2018.

* cited by examiner

VACUUM HOLDER WITH EXTENSIBLE SKIRT GASKET

FIELD OF THE INVENTION

The present disclosure relates to a vacuum holder for articles, a combination of a vacuum holder and an article, a carrier with autonomous vacuum, a system for holding and conveying articles, and a method for holding and conveying articles.

BACKGROUND

Various apparatuses and methods of holding and conveying articles are disclosed in the patent literature and on the internet. Patent publications disclosing apparatuses and methods of holding and/or conveying articles include: U.S. Pat. No. 3,229,953, Muir, Jr.; U.S. Pat. No. 3,426,884, Donner; U.S. Pat. No. 3,941,237, MacGregor, Jr.; U.S. Pat. No. 5,154,380, Risca; U.S. Pat. No. 5,651,941, Stark, et al.; U.S. Pat. No. 8,813,951, Forsthoevel, et al.; U.S. Pat. No. 9,032,880 B2, King, et al. (assigned to MagneMotion, Inc.); U.S. Pat. No. 9,085,420 B2, Williams, et al.; and, U.S. Pat. No. 9,193,108 B2, Seger, et al. Some types of vacuum holding devices are shown on the following internet sites: www.hysitron.com; www.toolocity.com; and www.vacmotion.com.

Many current conveyor systems use plastic "pucks" to transport bottles around the conveying systems. Such conveyor systems suffer from a number of drawbacks. The plastic pucks are often made to only fit one size and shape of an article, such as a bottle. The pucks also obstruct portions of the article so that it is not possible to apply decorations such as labels, stickers, shrink sleeves, and the like to the portions of the article behind the puck.

In conveyors in which an article is held in place on a conveyor by vacuum, the conveyor will typically have a hose that runs from a vacuum pump that is tethered to portion of the conveyor holding the article. As a result, at least a portion of the hose would ordinarily be required to travel along with the part of the conveyor to which it is attached.

Therefore, a need exists for, among other things, improved apparatuses and methods of holding and conveying articles.

SUMMARY

The present disclosure relates to: a vacuum holder for articles, a combination of a vacuum holder and an article, a carrier with autonomous vacuum, a system for holding and conveying articles, and a method for holding and conveying articles.

The vacuum holder may be used in many applications which currently utilize suction cups to adhere to the surface of an article. The vacuum holder, in certain uses, represents an improvement over suction cups with benefits that are not possible with suction cups. In some cases, a vacuum holder is provided for holding one or more articles. The vacuum holder has a retaining surface for holding one or more articles against the retaining surface by vacuum. The vacuum holder has a vacuum port at the retaining surface, a valve in fluid communication with the vacuum port through a passageway extending from the valve to the vacuum port. The valve can be closed so that after a vacuum is drawn, the vacuum holder can hold an article by vacuum untethered from attachment to a vacuum source.

In some cases, the vacuum holder can comprise an elastically extensible gasket adjacent at least a portion of the outer surface of the main body of the vacuum holder. The extensible gasket has an opening therein, and when the gasket is stretched and relaxed, the opening is sized and configured for fitting around the portion of the surface of the article to be held against the retaining surface of the vacuum holder and at least some portions of the article adjacent thereto. Such a gasket can be stretched and relaxed in any suitable manner and by any suitable stretching or expanding mechanism.

In other cases, the vacuum holder can comprise one part of a combination of a vacuum holder and an article. In such cases, at least one of the retaining surface of the vacuum holder and the surface of the article may be configured to provide a space between the retaining surface and the surface of the article wherein the space has an at least partial vacuum therein.

In other cases, the vacuum holder can comprise at least a portion of a vehicle or carrier with autonomous vacuum. The vehicle or carrier is, therefore, not required to be continuously in contact with a vacuum source. The vehicle can optionally comprise runners or wheels to facilitate movement of the vehicle.

In other cases, a system is provided for holding and conveying articles comprises the vacuum holder vehicle, a conveyor for moving the vacuum holder vehicle with an article held thereon from a first location to a second location, and a vacuum station along the conveyor. The vacuum station can draw a vacuum through the valve on the vacuum holder until an article is held against the vacuum holder. The vacuum holder with the article held thereon can then be conveyed untethered from a vacuum source.

In other cases, a method for holding and conveying articles is provided. The method comprises placing an article adjacent to the retaining surface of the vacuum holder, and drawing a vacuum at a vacuum station so that the article is held against the retaining surface of the vacuum holder. The method further comprises closing the valve so that the article is held against the retaining surface of the vacuum holder without being connected to the vacuum station. The vacuum holder with the article held thereon can then be conveyed untethered from a vacuum source.

Any of the embodiments described in this specification may be combined, or provided with any of the features of any other embodiment described herein in any suitable combinations.

Figure 1:
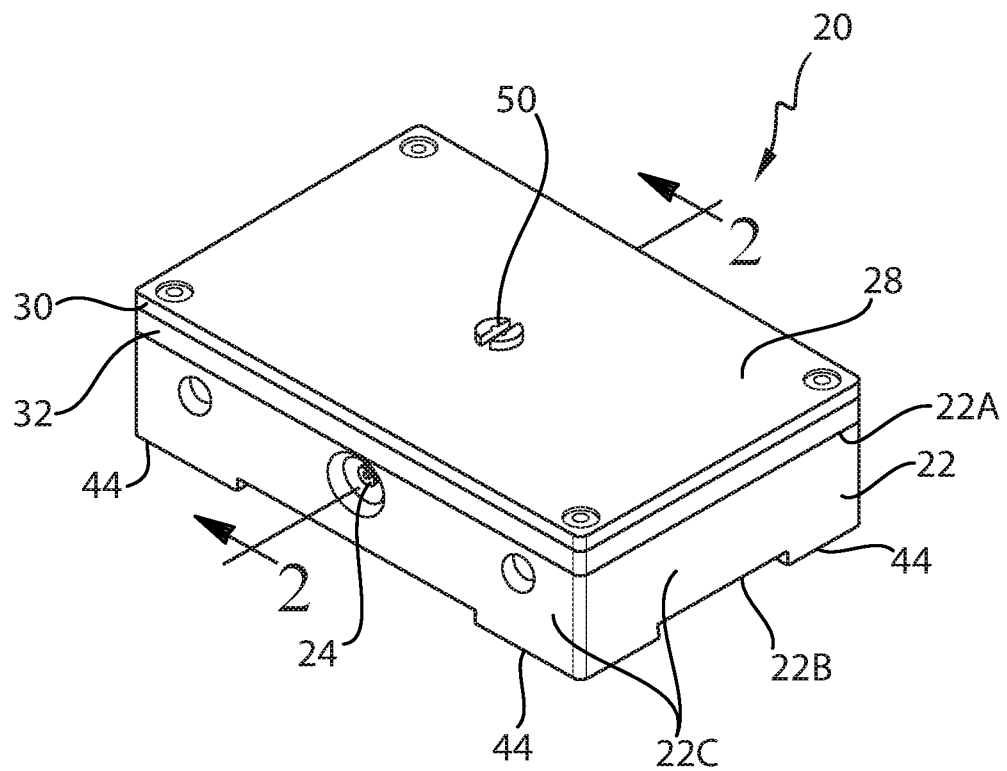
FIG. 1 is a perspective view of one non-limiting embodiment of a vacuum holder.

The embodiments of the method, apparatus(es), and articles shown in the drawings are illustrative in nature and are not intended to be limiting of the invention defined by the claims. Moreover, the features of the invention will be more fully apparent and understood in view of the detailed description.

DETAILED DESCRIPTION

The present disclosure relates to: a vacuum holder for articles, a combination of a vacuum holder and an article, a carrier with autonomous vacuum, a system for holding and conveying articles, and a method for holding and conveying articles.

Figure 2:
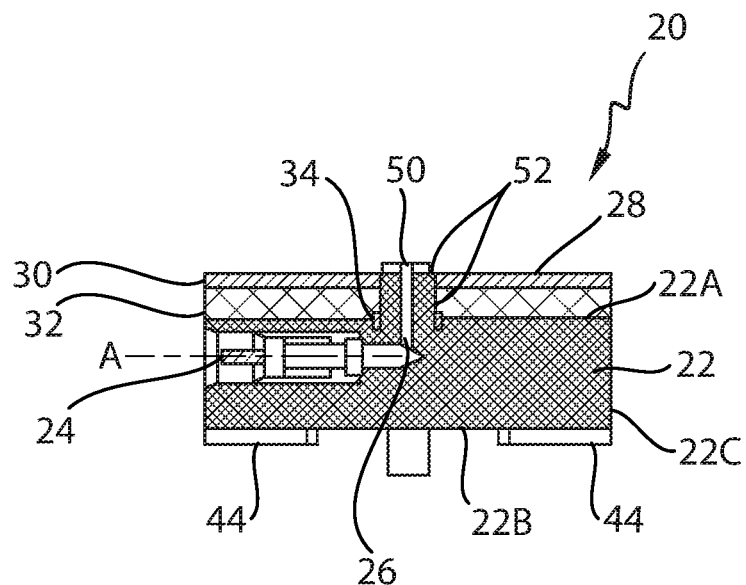
FIG. 2 is a cross-sectional view of the vacuum holder in FIG. 1 taken along line 2-2 of FIG. 1.

FIGS. 1 and 2 show one non-limiting embodiment of a vacuum holder 20. The vacuum holder 20 comprises a holder body (or "main body") 22 and a valve 24. The main body 22 has an outer surface 22A and may have a fluid (e.g., gas or air) passageway (or "passageway") 26 therein that leads to the outer surface 22A. The vacuum holder 20 has a retaining surface 28 for contacting the surface of an article. The valve 24 is joined to the main body 22 and is in fluid communication with the passageway 26. In the embodiment shown in FIG. 1, the vacuum holder 20 further comprises several optional components which comprise a gasket 30, a top plate 32, and an O-ring 34.

The vacuum holder 20 described herein provides autonomous untethered vacuum therefore, it is not required to be continuously in contact with a vacuum source. The term "untethered", as used herein, means that the vacuum holder is not connected to a vacuum source such as a vacuum pump or vacuum hose. It also means that the vacuum holder is not connected to any vacuum-creating mechanism that displaces air such as a handle that provides a cranking mechanism or other movement that is activated by a human for creating a vacuum, or a bellows or the like. The vacuum holder may be used in many applications which currently utilize suction cups to adhere to the surface of an article. The vacuum holder, in certain uses, represents an improvement over suction cups with benefits that are not possible with suction cups.

In other cases, the vacuum holder 20 can comprise at least a portion of a vehicle or carrier with autonomous vacuum. The vehicle or carrier is, therefore, not required to be continuously in contact with a vacuum source. When it is said that the vacuum holder can comprise at least a portion of a vehicle or carrier, it is meant that the vacuum holder 20 itself could comprise a vehicle or a carrier. In another example, the vacuum holder 20 may form a portion of a vehicle and when the vacuum holder is combined with another component (such as a motive mechanism, or part of a motive mechanism, that is capable of moving the vacuum holder 20) it could form a vehicle or carrier. In another example, the vacuum holder may be physically associated with (e.g., joined to), in any useful orientation, a vehicle or carrier that is capable of moving the vacuum holder.

The vacuum holder 20 can be used to adhere to and/or convey numerous different types of three dimensional articles 10. Such articles include, but are not limited to: bottles, cans, cups, containers, tubs or trays for holding multiple individual products, bags, cartons, flow wraps, tampon tubes, and deodorant stick containers. Although pucks can be subject to the disadvantages described above, the vacuum holder could also be used to convey pucks and other carriers which hold articles therein. While the vacuum holder 20 can easily transport conventionally-shaped articles (e.g., cylindrical, and/or symmetrical articles), the vacuum holder 20 shown in FIG. 1 is particularly suited to transport and control articles having shapes that are challenging to transport by other types of conveyors and pucks. The vacuum holder 20 can, for example, be used to transport: bottles with angled and/or off-center necks; asymmetrical bottles; bottles of non-constant cross-section, etc. The same vacuum holder can securely transport different article shapes, including different bottom shape and area surfaces, without need for any physical modification to the vacuum holder which is unlike many pucks and other types of conveyors. Similarly, the vacuum holder may comprise mechanisms to further secure the article to the holder that are integral to the holder rather than as part of a separate puck. Such mechanisms may consist of arms, straps, pins, depressions, and the like that may extend inwardly towards or outwardly from the surface of the vacuum holder. Such mechanisms may contact the article at one or more points beyond the portion of the article that is secured to the holder by means of the vacuum. Such mechanisms can advantageously be positioned to as to not interfere with any operations that might be performed on the article while secured to the holder such as decoration operations or filling operations in the case where the article is a container.

The articles 10 may have at least two opposing ends. For example, a bottle will have a top 12 and a base (or bottom) 14. The articles 10 have a surface 16 which comprises the outside (or exterior) of the article except for any opening(s) in the article. The surface 16 may comprise the bottom 14 and a front, a back, and/or sides of the article. The articles 10 may be solid as in the case of some toothbrush handles, or hollow in the case of bottles, for example. If the articles are hollow, they will also have an interior. For bottles and other containers, the interior may be accessible from the environment through one or more openings such as for receiving and dispensing fluent material. Such openings will typically be capable of being closed or sealed. Any openings may be provided, for example, at the top, bottom, or on the sides of the articles. The surface of the articles 10 may be flat or curved. The entire surface need not be either flat or curved. The curved surface may be simple or complex. For example, the surface of the articles 10 may have: portions that are flat; portions that are curved; or, the surface may have both flat portions and curved portions. For instance, in the case of bottles, at least a portion of the surface may have a convex curvature. It is also possible that some articles may have a surface in which a portion thereof has a concave curvature.

The main body 22 is any component that is suitable for containing the valve 24, or having the valve 24 at least indirectly joined thereto. The main body 22 may also provide, at least indirectly, a surface for retaining an article, including a structure for allowing the application of a vacuum to the article 10 to hold the article against the surface of the vacuum holder 20. The surface 28 against which the article is held is referred to herein as the "retaining surface" of the vacuum holder 20. In some cases, the main body 22 may also provide, at least indirectly, a surface for supporting an article. The outer surface 22A of the main body 22 is the surface of the main body 22 located nearest the surface of the article when the vacuum holder 20 holds an article. The main body 22 also has an opposed surface 22B that is located furthest from the surface of the article when holding an article, and sides 22C. When the main body 22 is described herein as providing a surface for supporting an article (and holding the article against its surface), this includes holding the article directly against the outer surface 22A of the main body 22, as well as holding the article indirectly against the outer surface 22A of the main body 22. An example of holding an article indirectly against the outer surface 22A of the main body 22 comprises holding the article against the outer surface 22A of the main body where the gasket 30 (and/or top plate 32, or other element) lies between the article 10 and the outer surface 22A of the main body 22. Depending upon the surface of the vacuum holder 20 that is directly presentable to a surface 16 of the article, the retaining surface 28 of the vacuum holder may comprise the outer surface 22A, the top plate 32 or the gasket 30.

Figure 3:
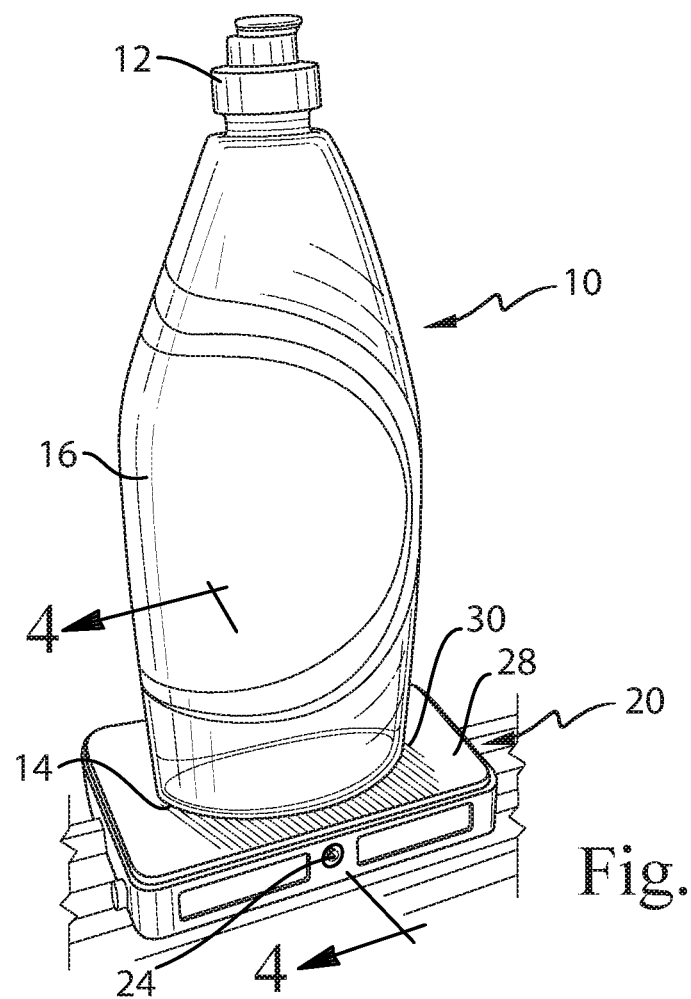
FIG. 3 is a perspective view of a vacuum holder with an article (a bottle) thereon.

The vacuum holder 20 and the main body 22 can be of any suitable configuration. If the article will rest on the vacuum holder 20 by gravity and be supported by the vacuum holder, then the vacuum holder 20 may be in the configuration of a platform for holding one or more articles. FIGS. 1-3 show one non-limiting embodiment of the vacuum holder 20. In this embodiment, the vacuum holder has the configuration of a generally rectangular prism. In this embodiment, the vacuum holder provides a rectangular platform for supporting one or more articles 10. In other embodiments, the platform can be circular, disk shaped, or any other suitable shape having any number of sides which outline any shaped platform such as including, but not limited, to the inclusion of geometric shapes in whole or part from the listing of a: simple, complex, concave or convex polygon; trapezoid; parallelogram; rhombus; diamond; ellipse; oval; or circle. Of course, the overall size/footprint of the vacuum holder 20 can be scaled up for larger articles, the holding of multiple articles, or, scaled down for one or more smaller articles.

The configuration of the retaining surface 28 may vary depending on the configuration of the portion of the surface of the article 10 which is intended to be held by the vacuum holder 20. Suitable configurations include those in which at least one of the retaining surface 28 and the portion of the surface of the article to be held is configured to provide a void space between the surface of an article and the retaining surface 28 of the vacuum holder 20. This void space provides a vacuum chamber 40 from which air can be evacuated to form an at least partial vacuum between the retaining surface 28 of the vacuum holder 20 and the surface 16 of the article.

The void space can be of any suitable size (that is, volume) and shape. The vacuum holder 20 can provide some holding benefit if there is no void space between the retaining surface 28 of the vacuum holder 20 and the surface 16 of the article. In such a case, the area on the surface of the article held by the vacuum holder 20 may only be the size of the area of the vacuum port. However, the holding force in such an embodiment may be relatively low. Therefore, it is typically desirable to provide a void space that interacts with a greater area on the surface 16 of the article than the area of the vacuum port.

Figure 4:
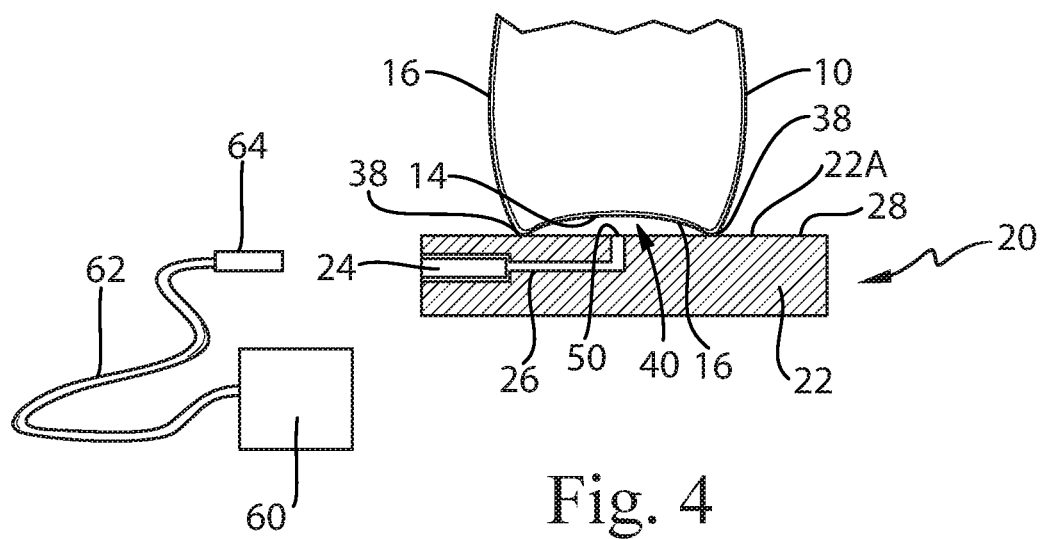
FIG. 4 is a simplified schematic cross-sectional view of the vacuum holder with a bottle thereon taken along line 4-4 of FIG. 3 (without the gasket and top plate, and with the bottle being fragmented), along with a vacuum source.

FIG. 4 shows that, in some cases, such as those in which the surface of the article 10 to be held has a concavity therein, the retaining surface 28 may have any suitable configuration so long as it is capable of contributing to form a void space with the surface of the article 10. The retaining surface 28 should also be capable of maintaining the at least partial vacuum in the vacuum chamber 40 without allowing ambient air to leak into the vacuum chamber by creating a continuous contact perimeter (shown on FIG. 4 as 38) between the retaining surface 28 and the surface 16 of the article 10. The configuration of the retaining surface 28 can have depressions or raised areas therein (provided that these do not allow air to leak in), and be concave, convex, substantially planar, or be any combination of the foregoing. Of course, any convexity in the retaining surface 28 must still allow for the creation of the void space. In some embodiments, particularly those in which it is desired for the vacuum holder 20 to serve as a platform to support an article 10, at least a portion of the retaining surface 28 may be substantially planar. For example, if the article 10 is a bottle that is to be held on the bottom 14 and supported by the retaining surface 28, and the bottom 14 of the article has an inward dome or concavity therein, then the concavity on the bottom of the bottle 10 will provide a suitable void space 40 even if (at least a portion of) the retaining surface 28 is substantially planar. When it is said that at least a portion of the retaining surface 28 is substantially planar, it may, but need not be completely planar.

It is also desirable to form a seal between the surface of an article to be held and the retaining surface 28 of the vacuum holder 20, particularly at the continuous contact perimeter 38, in order to maintain an at least partial vacuum in the vacuum chamber 40. As shown in FIGS. 1-3, this may be achieved by placing a gasket 30 between the surface of the article and the outer surface 22A of the holder body 22. The portion of the surface of the article 10 being held (for example, the bottom of the article 14) may be held adjacent to the outer surface 22A of the main body 22 with the gasket 30 between the surface of the article and the outer surface 22A of the main body 22. The gasket 30 can be any suitable element that is compliant (that is, conformable) and/or compressible so that it assists in forming a substantially airtight seal between the portion of the surface of the article being held and the retaining surface 28 of the vacuum holder 20. The gasket 30 can be made of any suitable at least partially air impervious material that is sufficiently impervious to air so as to allow the formation and maintenance of the vacuum for a sufficient period of time. Suitable materials include, but are not limited to polyurethane rubber, nitrile butadiene rubber (NBR), ethylene propylene diene monomer (EPDM) rubber, neoprene (polychloroprene) rubber, silicone rubber, processed natural gum rubber, or a thermoplastic resin with extremely low hardness that is formed into a flexible and durable elastomeric material for air or other gas leak testing instruments such as Cosmo SUPER GEL™ obtained from Cosmo Instruments Co., Ltd., Tokyo, Japan. In the embodiment shown in FIGS. 1-3, the gasket 30 is a flat rectangular piece of material that has a uniform thickness. The size, shape, thickness profile and material properties of the gasket 30 can be altered to allow an even broader range of articles to be held. These changes may also enable other transformation extremes like sending the vacuum holder 20 through heat tunnels, steam tunnels, chemical exposure, etc.

In other embodiments, the gasket 30 can be eliminated, and a top layer of the main body 22 can be provided with properties that allow it to serve the function that would have been performed by the gasket. This can be done, for example, by making the main body 22 using a dual shot injection mold where the top layer of the main body 22 is made of a compressible material such as a thermoplastic elastomer like ExxonMobil's SANTOPRENE™ or other synthetic rubbers including those among the examples mentioned earlier, and the remainder of the main body 22 is made of a more rigid material. Thus, the retaining surface 28 can be formed by the outer surface 22A of the main body 22 or the gasket 30.

Figure 5:
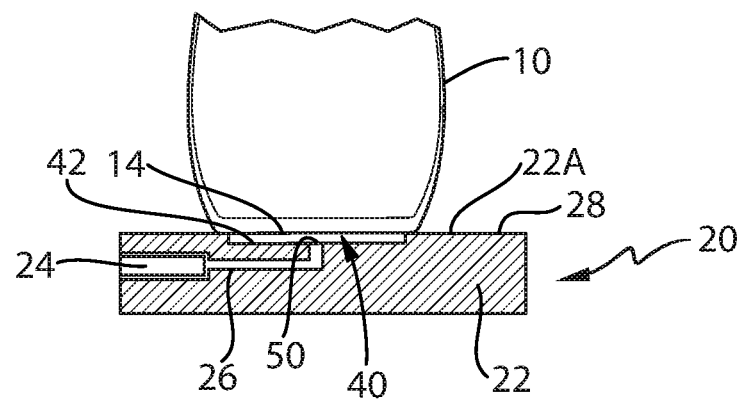
FIG. 5 is a schematic cross-sectional view of another embodiment of a vacuum holder with a bottle thereon (the bottle being fragmented).

FIG. 5 shows that, in other cases, at least a portion of the retaining surface 28 may have a concavity (or "recess") 42 therein. The concavity (or recess) 42 may be of any suitable configuration. For example, if the article 10 is a bottle that is to be held on the bottom 14 and supported by the retaining surface 28, and the bottom 14 of the article 10 is substantially planar, at least a portion of the retaining surface 28 may have a concavity 42 therein to provide the vacuum chamber 40. Alternatively, the outer surface 22A of the main body 22 may be substantially planar, and a gasket with a concavity or void therein may be placed between the outer surface 22A and the surface of the article to provide the vacuum chamber.

Figure 6:
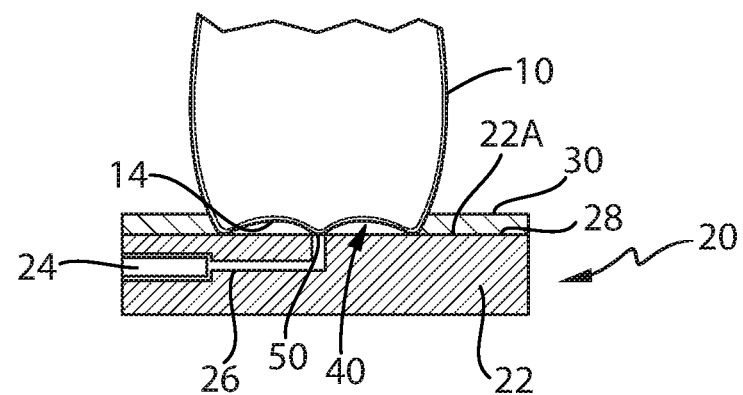
FIG. 6 is a schematic cross-sectional view of another embodiment of a vacuum holder with a bottle thereon (the bottle being fragmented).

In other cases, as shown in FIG. 6, it may be desirable to provide the vacuum holder 20 or main body 22 with other features, or to provide the retaining surface 28 with configurations other than a substantially planar configuration, or a configuration with a concavity therein. Such other cases may occur if the surface of the article 10 to be held has a configuration in which gaps are formed that would prevent the formation of a sealed void space (that is, a continuous contact perimeter) with a retaining surface 28 that has either a substantially planar configuration, or a configuration with a concavity therein. For example, such a situation would be present if the article 10 is a bottle that is to be held on the bottom and supported by the retaining surface, and the bottom of the article has a central concavity therein which is surrounded by a plurality of spaced apart feet (such as in disposable plastic water bottles currently in wide use), sometimes referred to as "petals" in the case of blown bottles. Air would tend to leak in through the spaces between the feet. In such cases, the retaining surface 28, such as the surface of the gasket 30 can be configured (e.g., by molding, thickness profiling or other methods) to more closely conform to the configuration of the bottom surface 14 (or other surface to be held) of the article 10. In some cases as shown in FIG. 6, the gasket 30 can extend along at least a portion of the sides of the article 10 to form a skirt gasket seal. In such cases, it may not be necessary for any portions of the gasket 30 to be positioned between the bottom 14 of the article 10 and the main body 22. Of course, in other embodiments, the gasket 30 may form a seal along portions of the sides of the article, and also comprise a portion that is positioned between the bottom 14 of the article 10 and the main body 22.

Figure 6A:
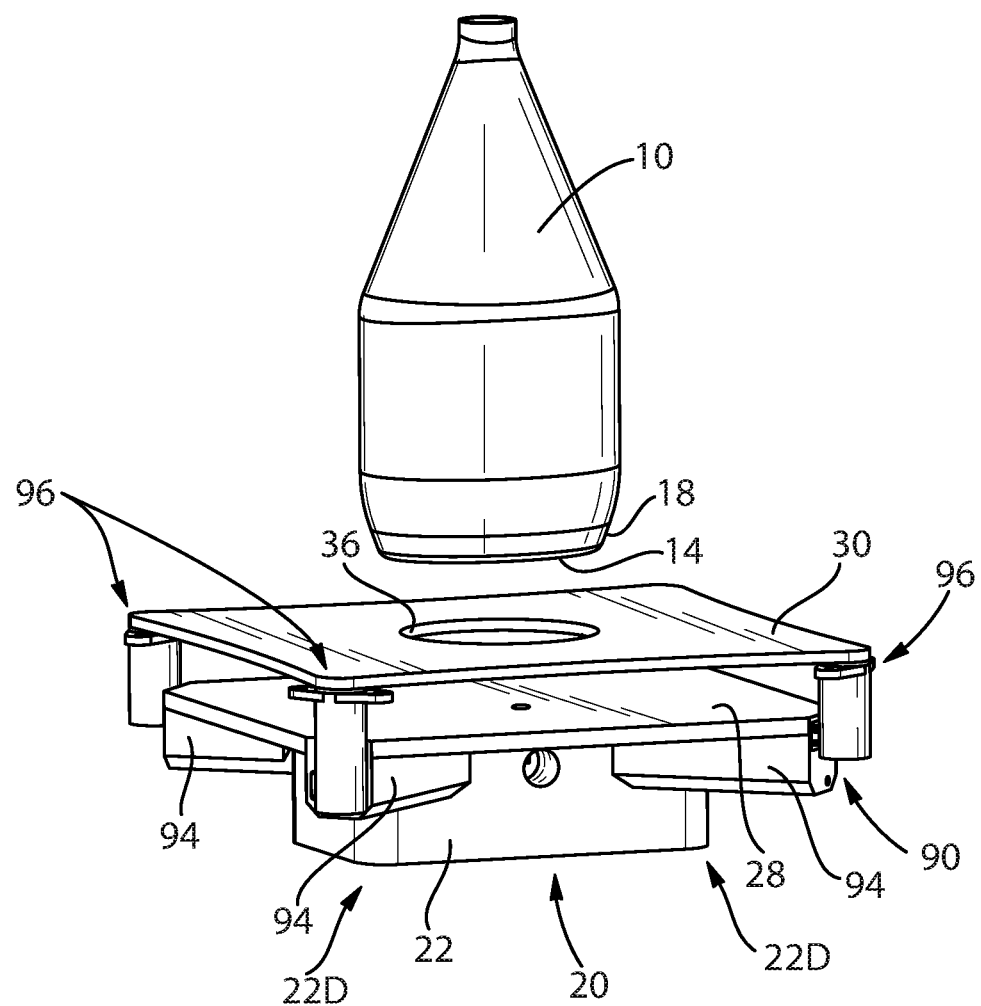
FIG. 6A is a perspective view of another embodiment of a vacuum holder showing a bottle positioned above the vacuum holder and an extensible gasket, wherein the vacuum holder is configured to stretch the extensible gasket (the gasket being shown in an unstretched condition).
Figure 6B:
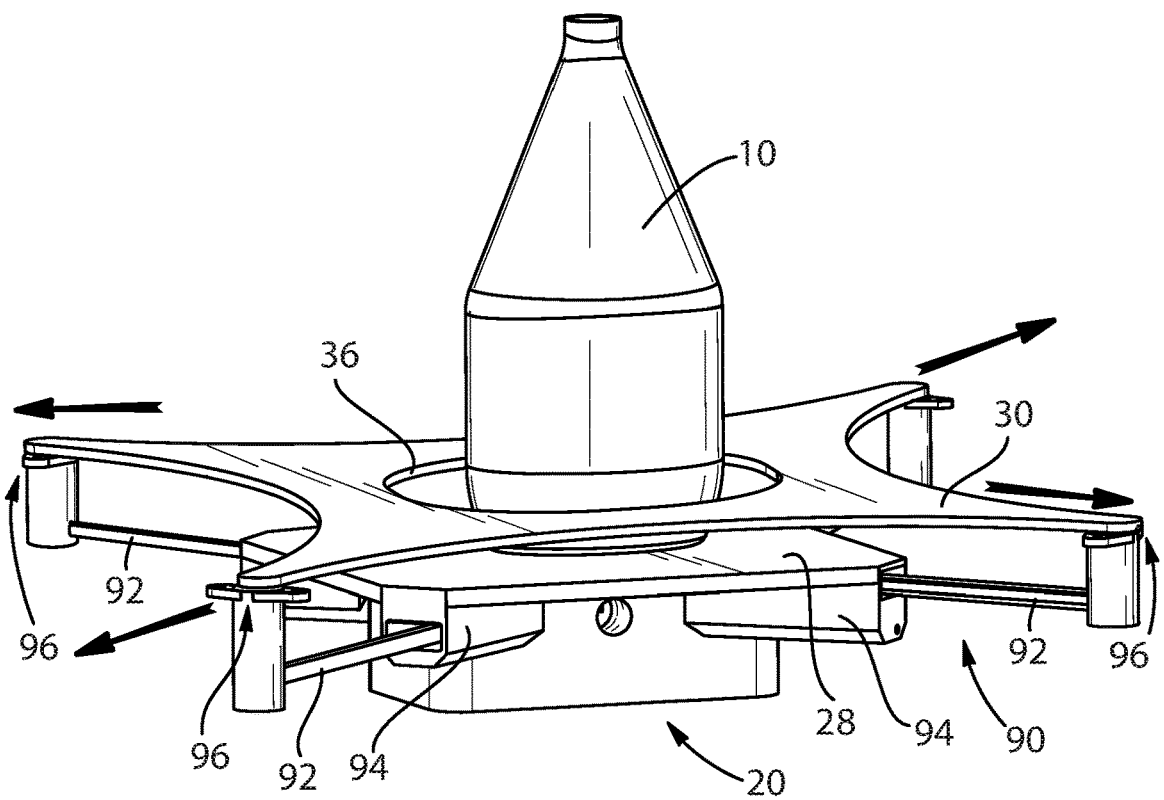
FIG. 6B is a perspective view of the vacuum holder shown in FIG. 6A showing the gasket in a stretched condition, and the bottle placed inside an opening in the gasket.
Figure 6C:
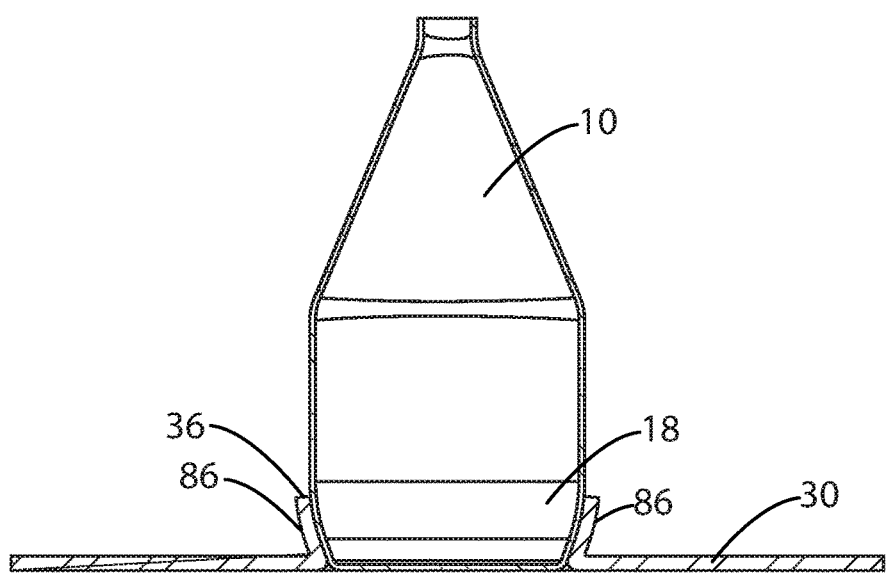
FIG. 6C is a schematic cross-sectional view of the bottle with the gasket forming a skirt around the base of the bottle.

FIGS. 6A-6C show another embodiment of a gasket 30 that can be used for holding such articles 10. In the embodiment shown in FIGS. 6A-6C, rather than comprising a flat continuous piece of material, or a piece of material having a surface that is configured to conform to the bottom surface of the article 10, the gasket 30 has an opening or hole (or aperture) 36 therein. The gasket 30 comprises an elastically extensible material that has a first (or initial) unextended configuration and dimensions and a second extended configuration and dimensions. The elastically extensible gasket material is capable of extension in the plane of the surface of the gasket by application of tensile forces to the same. After the tensile forces are removed from the material (the material is relaxed), it retracts back to a third (or relaxed) configuration and dimensions. The gasket material retracts at least part of the way to its initial unextended configuration and dimensions. If the gasket material retracts back to its initial unextended configuration and dimensions, then its relaxed configuration and dimensions will be the same as its first configuration and dimensions. If the gasket material only retracts part of the way to its initial configuration, then its third configuration and dimensions will be between its first and second configuration and dimensions.

This gasket 30, in its unextended configuration, has an opening 36 with a perimeter having a length (measured along the perimeter) that is smaller than the dimensions of the perimeter of the base 18 of the article 10. For the purpose of describing this embodiment, the term "base of the article", refers to the portion of the article 10 that is positioned adjacent to the surface of the vacuum holder. The base 18 of the article 10 therefore may, but need not, be at the bottom 14 of the article. In addition, the "base" of the article 10 may also include portions of the article (such as on the sides of the article as shown in FIG. 6C) that are adjacent to the portion of the article that is in contact with the vacuum holder (the "contact surface"). That may occur if the gasket 30 contacts portions of the article that are adjacent to, but displaced from, the contact surface. The opening 36 in the gasket 30 can be of any suitable shape including, but not limited to circular and oval. (Thus, the length of the perimeter of a circular opening will be that of its circumference.) The opening 36 can be of any suitable size and shape, provided that the perimeter of the opening 36 is smaller than the perimeter of the base 18 of the article 10 after the gasket 30 is stretched and relaxed. This will allow the gasket 30 to fit snugly around the base 18 of the article 10. The outer dimensions of the gasket 30 (that is, the outer perimeter of the gasket 30) will typically be larger than base 18 of the article 10.

This embodiment operates as follows. The extensible gasket 30 is extended so that the opening 36 is larger than the base 18 of the article 10. The article 10 is then placed through the opening 36 in the gasket 30 and on top of the retaining surface 28 of the vacuum holder 20. The gasket 30 is then allowed to retract so that the opening 36 in the gasket 30 fits snugly around the base 18 of the article 10. As shown in FIG. 6C, this causes the portion of the gasket 30 adjacent to the opening 36 to form a skirt around the base 18 of the article 10. More specifically, the portion of the gasket adjacent to the opening 36 is disposed toward the end of the article opposite the base (upward in this drawing figure) and out of the plane of the remainder of the gasket to form a lip or rim 86.

Figure 6D:
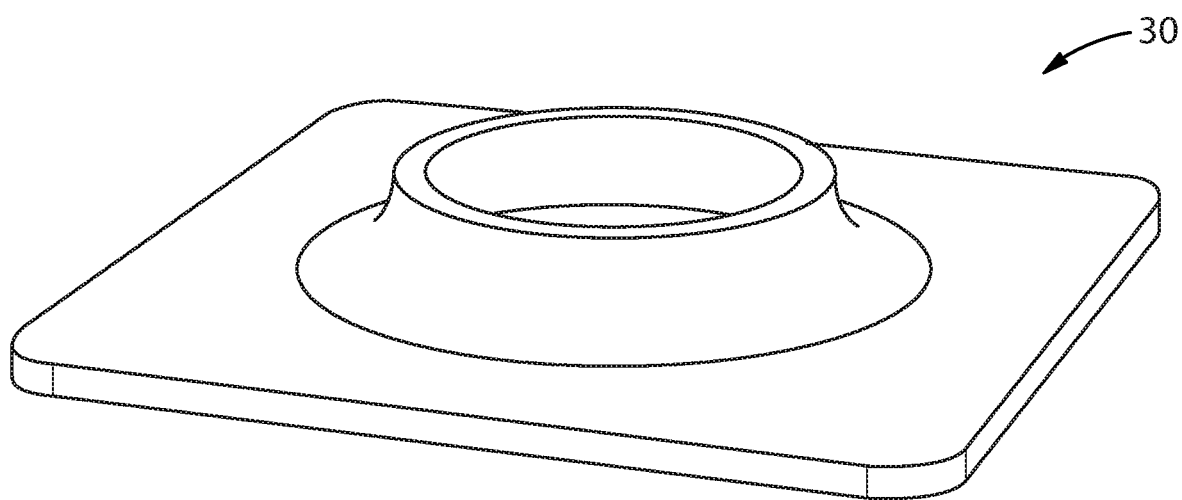
FIG. 6D is a perspective view of an alternative gasket having a volcano-shaped configuration.

Various alternative embodiments of the extensible gasket 30 are also possible. For example, FIG. 6D shows an extensible gasket 30 with a truncated cone shape or volcano-shaped configuration. In such a case, the smaller opening or mouth of the volcano will be facing upward so that it faces away from the retaining surface 28 of the vacuum holder 20. The volcano-shaped gasket configuration has been found to be beneficial in ensuring that the extensible gasket 30 will assume the configuration shown in FIG. 6C after the gasket is relaxed and makes contact with the base 18 of the article. Without the volcano shape, the gasket can sometimes buckle upward resulting in an upside down version of the shape of the gasket shown in FIG. 6C, which may not form an adequate seal with the surface of the article 10.

Ideally, the elastically extensible gasket 30 is made of a material that has certain properties. These include: (1) the ability to undergo a relatively high degree of stretching or strain without breaking; (2) the ability to be repeatedly stretched over a large number of extension/relaxation cycles with minimal loss of its modulus of elasticity; and (3) exhibits low stress at various strains up to the strain at which breakage occurs.

The term "extensible", as used herein, means the ability to stretch or elongate, without rupture or breakage, to at least 50% strain, for example, as described below in the Hysteresis Test. The terms "elastic," "elastomeric," and "elastically extensible" mean the ability of a material to stretch by at least 50% strain without rupture or breakage at a given load, and upon release of the load the elastic material or component exhibits at least 75% recovery (i.e., has less than 25% set). For example, an elastic material that has an initial length of 25.4 mm can stretch to at least 38.1 mm (50% strain) and, upon removal of the force, retract to a length of 30.5 mm (i.e., have a set of 5.1 mm or 20%). Stretch, sometimes referred to as strain, percent strain, engineering strain, draw ratio, or elongation, along with % recovery and % set may each be determined according to the Hysteresis Test described below.

With respect to the property of strain without breaking, the gasket 30 may be capable of surviving a strain of at least about 50% to at least about 1,100%, or more (or any 100 percent increment therebetween—e.g., 100%, 200%, 300%, 400%, 500%, etc.) without breaking. It is understood, however, that the gasket 30 may experience strain of less than 50% in use (e.g., as low as about 20%) to load and hold articles of the same size and cross-sectional shape. It is believed that a strain of as low as about 20% to about 100% may be sufficient to load articles having many different cross-sectional shapes (circle, square, oval, hexagon, etc.) so long as the base 18 of the articles 10 have substantially the same perimeter and aspect ratio. If it is desired to use the extensible gasket with a range of articles that vary in the size of their perimeter, higher amounts of strain (e.g., 200%, 300%, 400%, 500%, etc.) may be desirable.

It is desirable for the gasket to be capable of such strain through multiple cycles as described below. When it is said that it is desirable for the gasket to undergo "insubstantial loss" (or synonymously "minimal loss") of its modulus of elasticity, this means that the gasket does not: (a) sag to such a degree that it interferes forming a seal with the desired part of the article; and/or (b) fail to retract sufficiently to form an air tight seal with the article.

With respect to the property of being able to be repeatedly stretched over a large number of extension/relaxation cycles with minimal loss of its modulus of elasticity, it may be desirable for the gasket to be capable of undergoing at least 1,000 cycles up to 100,000 cycles, or more (or any 10,000 cycle increments therebetween). For example, it may be desirable for the extensible gasket material to be capable of undergoing up to 1,000, 5,000, 10,000, 50,000, or more cycles (or any increment of 1,000 cycles between these numbers) while maintaining its properties sufficiently to perform its intended function (such as its modulus of elasticity). For example, one material, after being extended to a strain of 400% and relaxed to a strain of 100%, and being cycled between such strains up to 100,000 times, may exhibit a decrease of modulus of elasticity of only about 40% or less at a strain of up to 1,000%, or a decrease of modulus of elasticity of only about 30% or less at strain of up to 800%, or a decrease of modulus of elasticity of only about 25% or less at strain of up to 400%, or a decrease of modulus of elasticity of only about 10% or less at a strain of up to 200%.

With respect to the property of exhibiting low stress at various strains up to the strain at which breakage occurs, this refers the ease with which the gasket 30 can be stretched to ensure that the opening 36 is larger than the base 18 of the article 10. A low stress, thus, is indicative of a gasket that can be stretched with ease. It may be desirable that the gasket material exhibit a stress of less than 0.5 MPa, 0.4 Mpa, 0.3 Mpa, 0.2 MPa, 0.1 MPa or 0.05 MPa at a strain of up to about 200% and/or the gasket material exhibit a stress of less than less than 0.5 MPa, 0.4 Mpa, 0.3 Mpa, 0.2 MPa, or 0.1 MPa at a strain of up to about 500% and/or the gasket material exhibit a stress of less than 0.5 MPa at a strain of up to about 1,000%. It may also be desirable that the gasket material exhibit a minimal level of stress at low strain so that the gasket 30 will not sag too much. For example, it may be desirable that the gasket material exhibit a stress of greater than or equal to about 0.01 MPa at a strains equal to 10% or greater.

Figure 12:
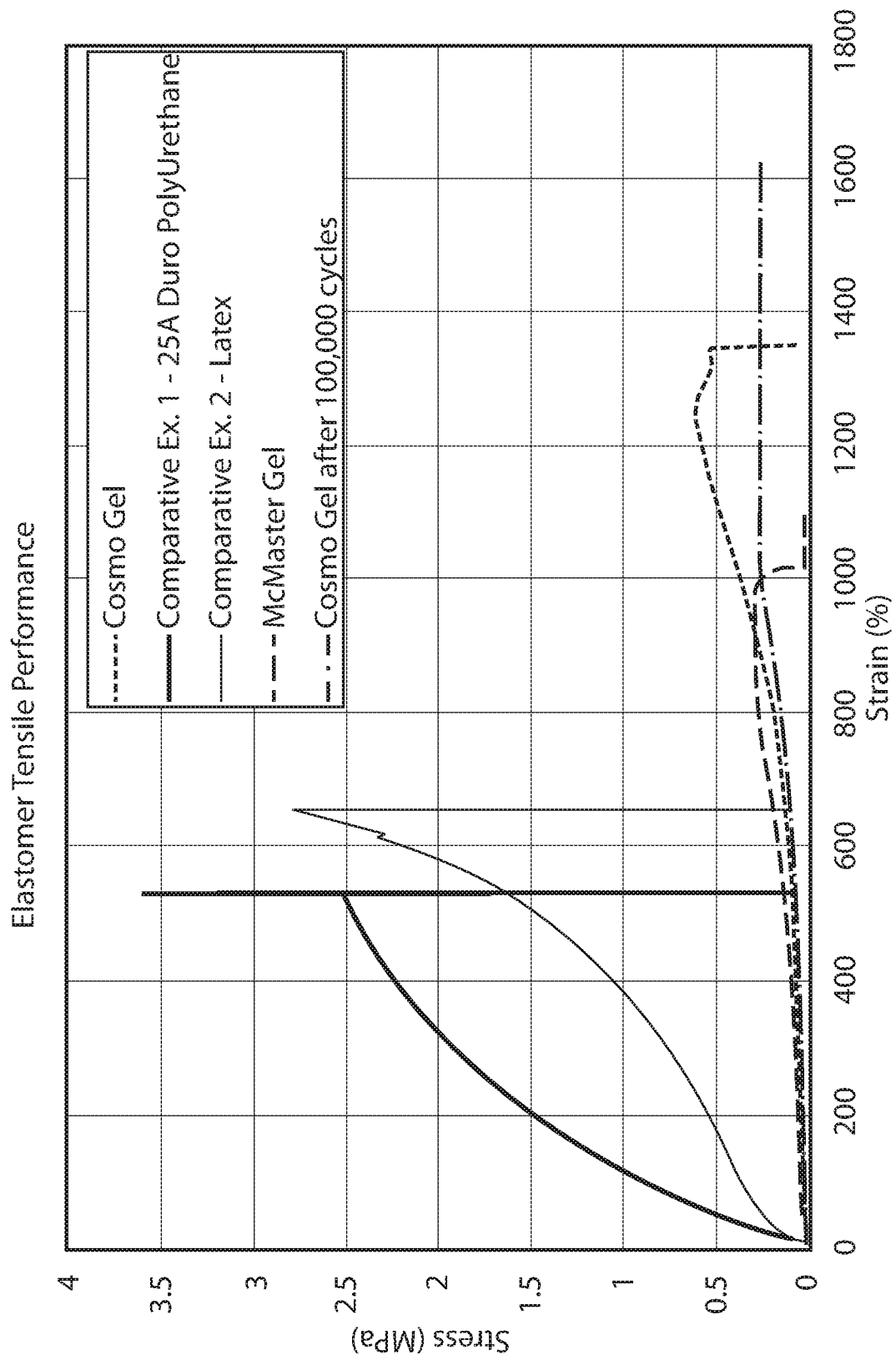
FIG. 12 is a stress/strain curve for several materials, some of which are suitable for use as elastically extensible gasket materials.

FIG. 12 shows several elastically extensible materials that have been proposed for use an elastically extensible gasket. Comparative Ex. 1 is 25A Duro polyurethane. Comparative Ex. 2 is latex rubber. While it is believed that the materials described in Comparative Exs. 1 and 2 can be used, they are less preferred. Suitable materials may include thermoplastic elastomers.

One suitable material for such a gasket 30 is Cosmo SUPER GEL™. Cosmo SUPER GEL™ has an Asker C hardness from 0 to 30 degrees. Cosmo SUPER GEL™ is very useful for this purpose because it is highly elastically extensible, extremely durable, and conforms closely to the configuration of the article. As shown in FIG. 12, Cosmo SUPER GEL™ is capable of undergoing a strain of over 1,100% before it reaches its necking point at a stress of slightly over 0.7 MPa. The necking point of a material is the point where a material begins to permanently deform, such that it begins to lose its elasticity, among other properties. FIG. 12 also shows that Cosmo SUPER GEL™ is capable of undergoing a strain of over 1,200% before failure.

Another material that may be suitable for use as an extensible gasket which is shown in FIG. 12 is McMaster Carr #1782T54 thermoplastic elastomer available from the McMaster-Carr Supply Company, Elmhurst, Ill., U.S.A.

The extensible gasket 30 can be of any suitable thickness provided that it is able to conform closely to the article and form a seal with the article. A suitable range of thickness is between about 2 mm and about 8 mm. In some cases, the extensible gasket 30 can be about 5 mm thick.

The extensible gasket 30 can be extended and retracted in any suitable manner and by any suitable stretching or expanding mechanism (or simply "expanding mechanism"). It should be understood that even though it may not always be shown in these embodiments, at least one of the retaining surface and the surface of the article is configured to provide a void space between the surface of the article and the retaining surface.

FIGS. 6A and 6B show one expanding mechanism 90 for extending and retracting the extensible gasket 30. In this embodiment, the expanding mechanism 90 comprises part of the vacuum holder 20. Such a mechanism 90 can take many possible different configurations. In the embodiment shown, the expanding mechanism 90 comprises a plurality of pistons 92 (shown extended from piston housings 94 in FIG. 6B) with grippers or clamps 96 joined thereto. The pistons 92 can extend from any suitable portion of the vacuum holder. In the embodiment shown, there are four pistons 92, and each piston 92 extends from a piston housing 94 at one of the corners 22D of the main body 22 of the vacuum holder 20.

As shown in FIG. 6B, the pistons 92 are movable diagonally outwardly away from the opening 36 in the gasket 30 to increase the size of the opening 36 so that it is larger than the base 18 of the article 10. After the base 18 of the article 10 is placed within the opening 36 (and the base of the article is in contact with the retaining surface 28 of the vacuum holder 20), the pistons 92 allow the gasket 30 to retract, and the portions of the gasket 30 adjacent to the opening 36 fit closely around the base 18 of the article 10. In embodiments in which the gasket 30 has an opening 36, the retaining surface 28 that the surface of the base of the article 10 is placed in contact will typically be the outer surface 22A of the main body 22 or top plate 32 of the vacuum holder 20 (rather than the gasket 30). The grippers 96 in this embodiment may continue to grasp the gasket 30 at all times, including after the vacuum is drawn. Since the grippers 96 do not release the gasket 30, this avoids the challenge of the grippers 96 having to reacquire (or regrip) the gasket 30 when it is time to extend the gasket again.

Figure 6E:
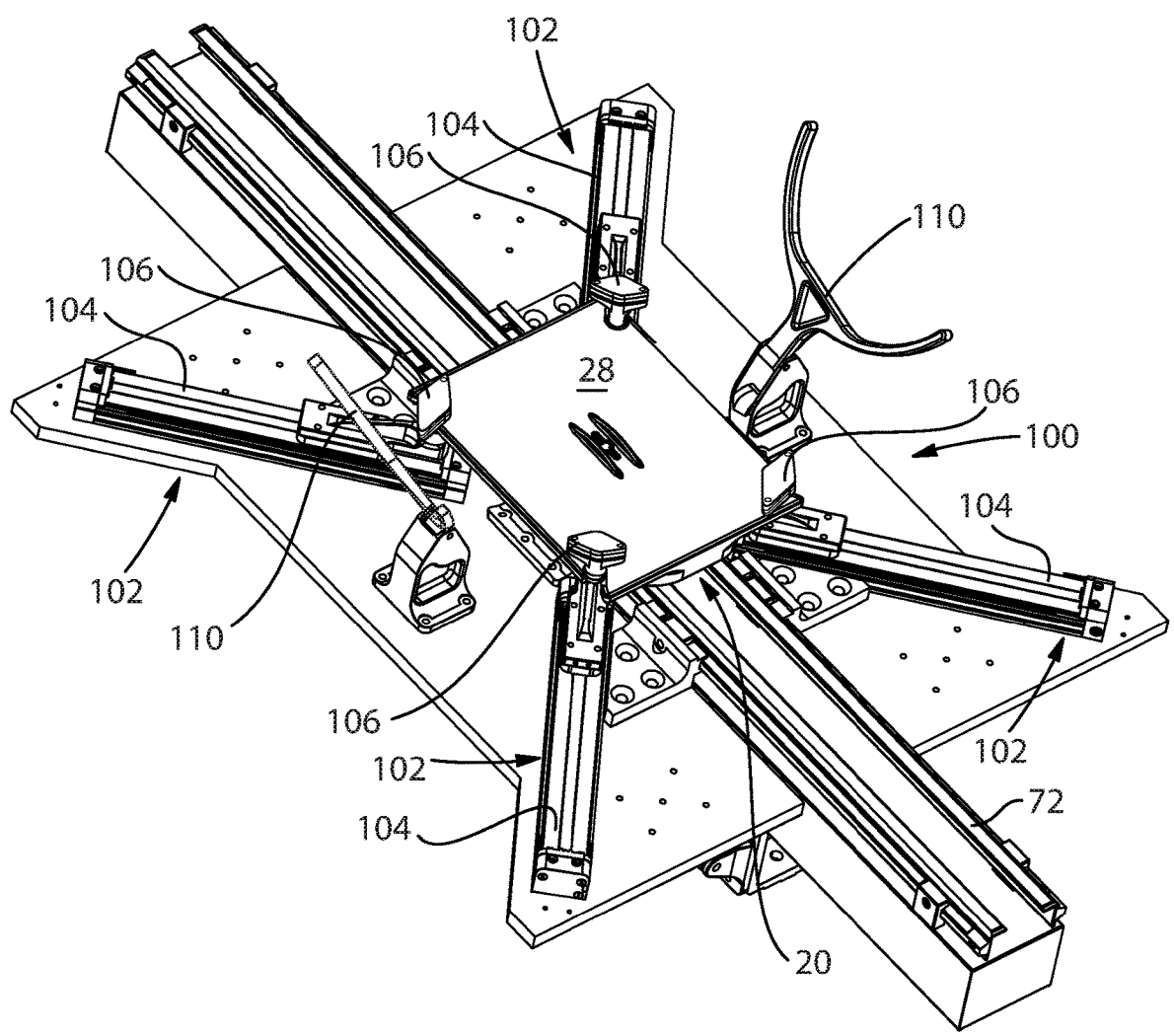
FIG. 6E is a perspective view of a stretching/expanding mechanism for stretching an extensible gasket shown without the gasket and with the mechanism in an unextended configuration.
Figure 6F:
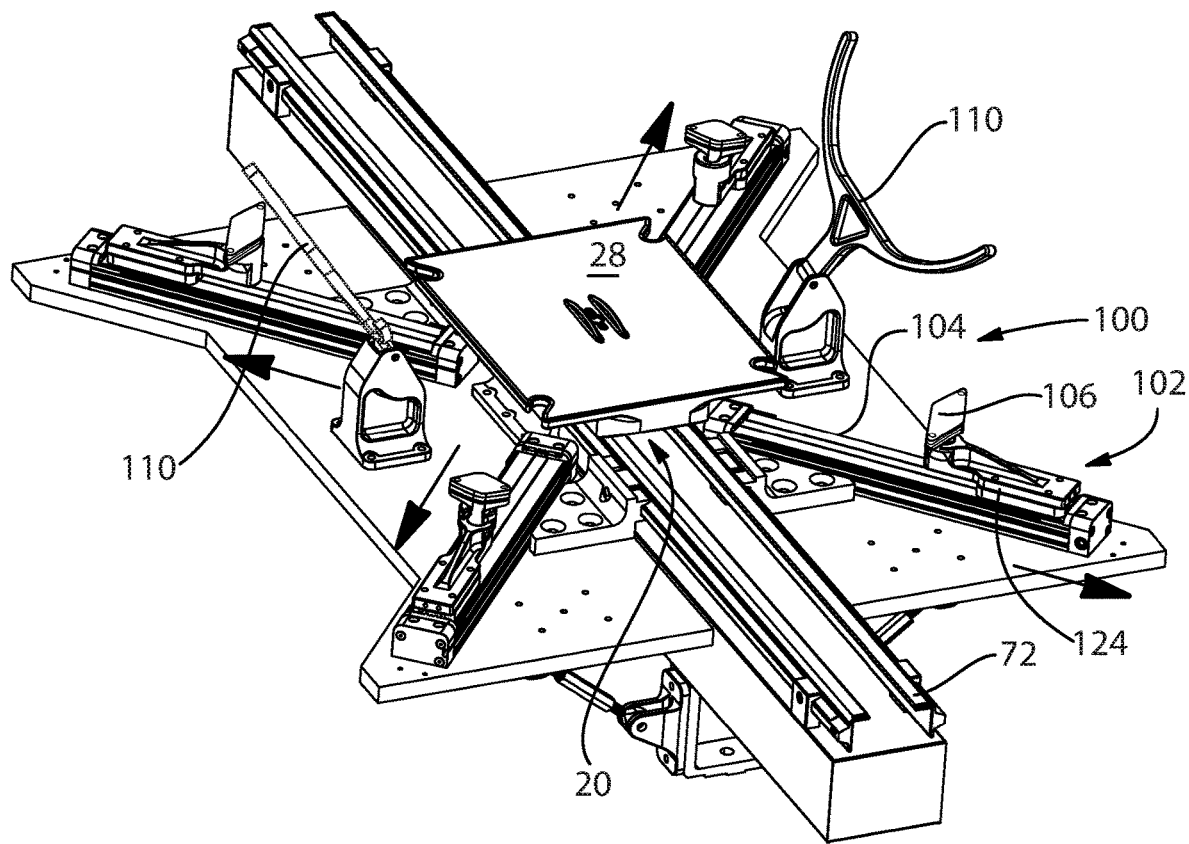
FIG. 6F is a perspective view of the expanding mechanism in FIG. 6E shown without the gasket and with the mechanism in an extended configuration.
Figure 6G:
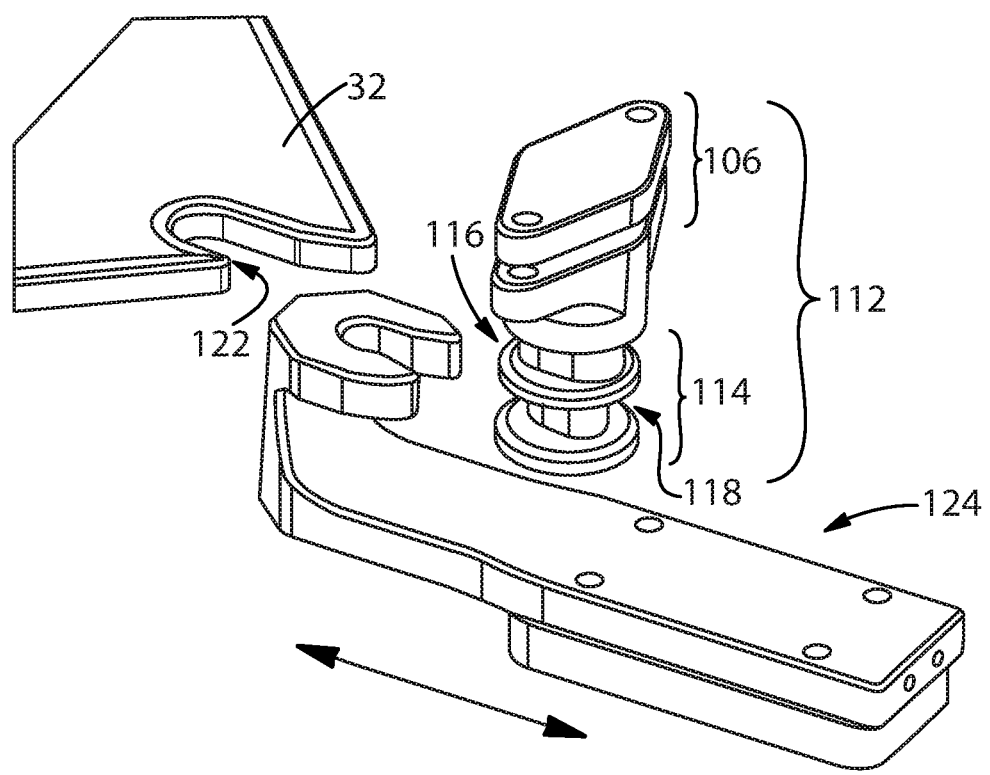
FIG. 6G is an enlarged perspective view of the sliding gripper assembly used in the expanding mechanism shown in FIGS. 6E and 6F.
Figure 6H:
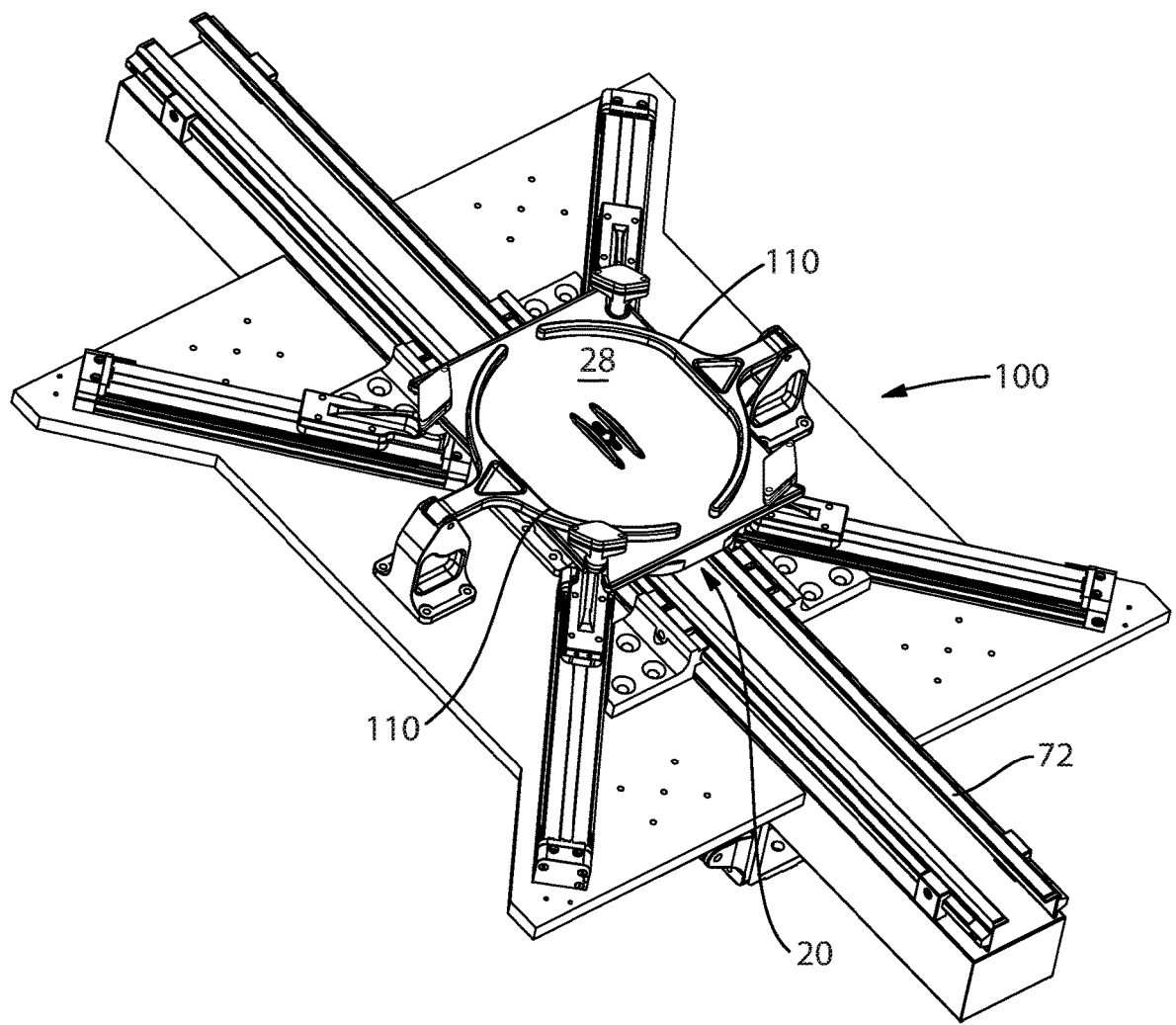
FIG. 6H is a perspective view showing how the optional arms of the stretching/expanding mechanism can be folded over to push the gasket (not shown) down on the top of the vacuum holder.

In this embodiment, if the corners of the gasket 30 remain slightly elevated above the retaining surface after stretching, it may be desirable to provide a placement or "positioning" mechanism that pushes the gasket 30 against the top surface of the vacuum holder 20 before a vacuum is drawn. Such a positioning mechanism can be part of a mechanism (such as at an article loading station) that is separate from the vacuum holder 20. One non-limiting embodiment of such a positioning mechanism 110 is shown and described in FIGS. 6E, 6F, and 6H below. Of course, in other embodiments, such a positioning mechanism may comprise part of the vacuum holder 20.

FIGS. 6E-6H show another expanding mechanism 100 for extending and retracting the gasket 30. This expanding mechanism 100 is separate from the vacuum holder 20, and works in conjunction with (that is, as part of a combination with) a vacuum holder 20. In the embodiment shown, the vacuum holder 20 is in the form of a vehicle that travels around a conveyor 72 in the form of a track system. Such a track system is described in greater detail below. As shown in these figures, this expanding mechanism 100 can be located at a station along the track system. For example, the expanding mechanism 100 can be located at a station for loading vehicles with the article to be transported. Such a mechanism 100 can take many possible different configurations.

In the embodiment shown, this expanding mechanism 100 comprises four movable gripping mechanisms 102 for gripping the four corners of the gasket to extend the gasket. (The gasket is not shown in FIGS. 6E-6H, but may be the same as that shown in FIGS. 6A-6D). The movable gripping mechanisms 102 comprise a gripper track 104 along which grippers or clamps 106 are slidably movable. The movable gripping mechanisms 102 are movable diagonally outwardly away from the opening 36 in the gasket 30 to increase the size of the opening 36 so that it is larger than the base 18 of the article 10. One of the gripping mechanisms 102 is shown in greater detail in FIG. 6G. The clamps 106 in the drawing are part of clamp assemblies 112 that may be referred to as "bobbins" (not because they hold thread, but because they may have components that resemble the shape of a bobbin). The top part of these bobbins 112, the clamps 106, are permanently attached to the gasket corners (that is, until the gasket is replaced). The bottom part 114 of the bobbin 112 is shaped like two spools stacked one on top of the other. The spools define an upper spool groove 116 and a lower spool groove 118. The upper spool groove 116 slips into a slot 122 in the corner of the vacuum holder 20 top plate 32. When it is time to expand the gasket 30, a sled 124 slides into the lower spool groove 118 at the bottom of the bobbin 112 and carries the bobbin away from the holder top plate slot 122 outwardly away from the gasket opening 36 (not shown). When the gasket 30 is retracted, the sled 124 carries the bobbin 112 back towards the center and "drops it off" back in the slot 122 at the corner of the holder top plate 32. With the sleds 124 in the retracted position, and the bobbins 112 in the grooves in the top plate 32, it is still possible for the vacuum holder 20 to pass freely over the sleds 124 without interference.

As in the case of the prior embodiment, after the base 18 of the article 10 is placed within the opening 36 (and the base of the article 10 is in contact with the retaining surface 28 of the vacuum holder 20), the gripping mechanisms 102 allow the gasket 30 to retract and the opening 36 in the same to fit closely around the base 18 of the article 10.

This embodiment may also include a positioning mechanism 110 to push at least portions of the gasket 30 flat against the retaining surface 28 of the vacuum holder 20. This may be desirable before a vacuum is drawn to ensure an airtight seal is formed. In the embodiment shown, the positioning mechanism comprises a pair of arms 110 that push the gasket 30 against the top surface of the vacuum holder 20.

It should be understood that while the embodiments of the expanding mechanisms described herein grip the corners of the gasket 30 in order to extend the same, the invention is not limited to such embodiments. In other embodiments, any suitable portions of the gasket 30 (such as the sides of the gasket 30) can be gripped and extended by any suitable mechanism.

FIGS. 6I-6M show still another expanding mechanism 130 for extending and retracting an extensible gasket 30. In this embodiment, the expanding mechanism 130 comprises part of the vacuum holder 20. Such a mechanism 130 can take many possible different configurations. In the embodiment shown, the expanding mechanism 130 comprises a frame 132 with a generally circular configuration. The frame 132 comprises retaining members for holding the edge portions of the extensible gasket 30. The retaining members can be in any suitable number and configuration. The only requirements are that the retaining members be capable of holding the edge portions of the extensible gasket 30 therebetween, and that air tight chambers are formed as described below.

Figure 6I:
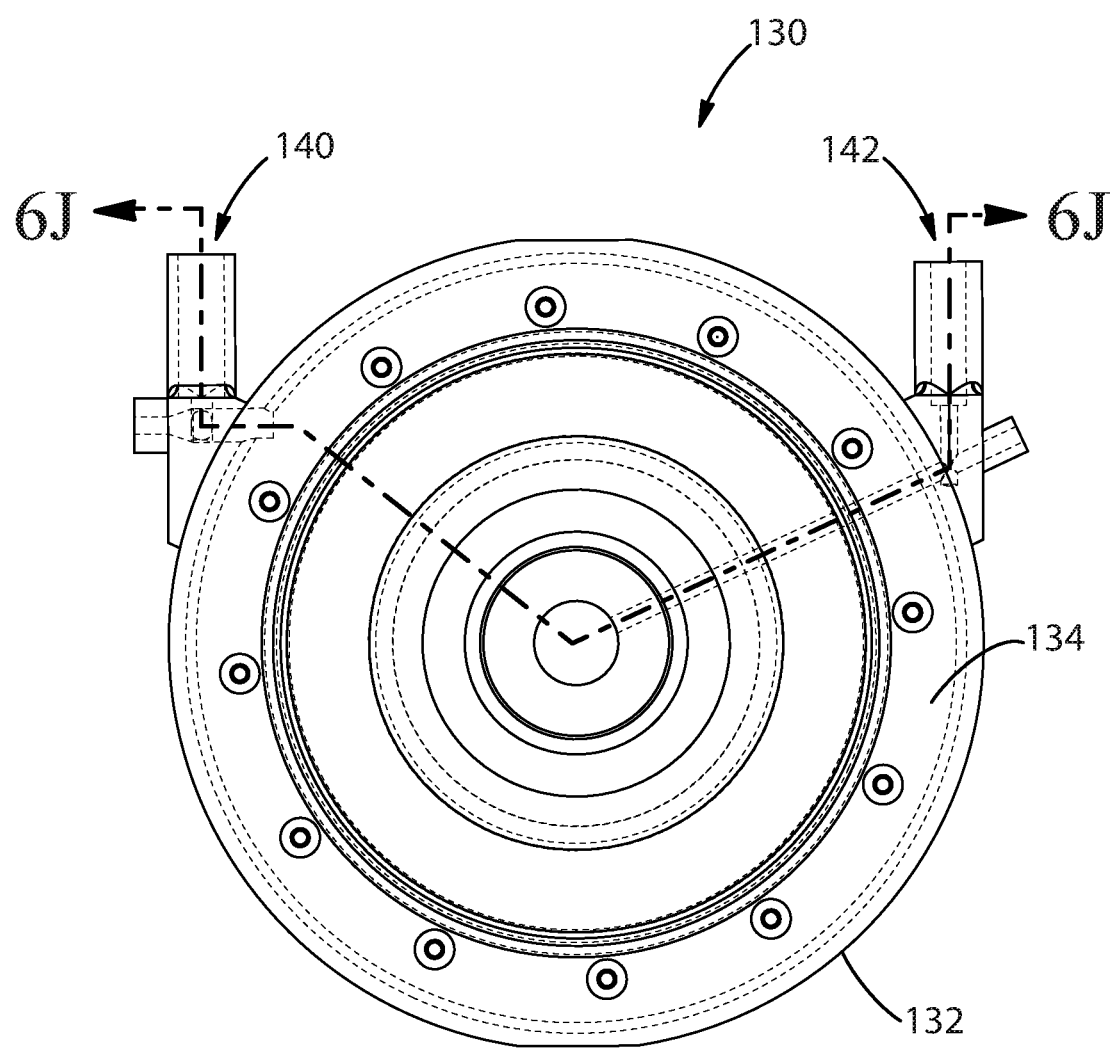
FIG. 6I is a plan view of another type of expanding mechanism for stretching an extensible gasket.
Figure 6J:
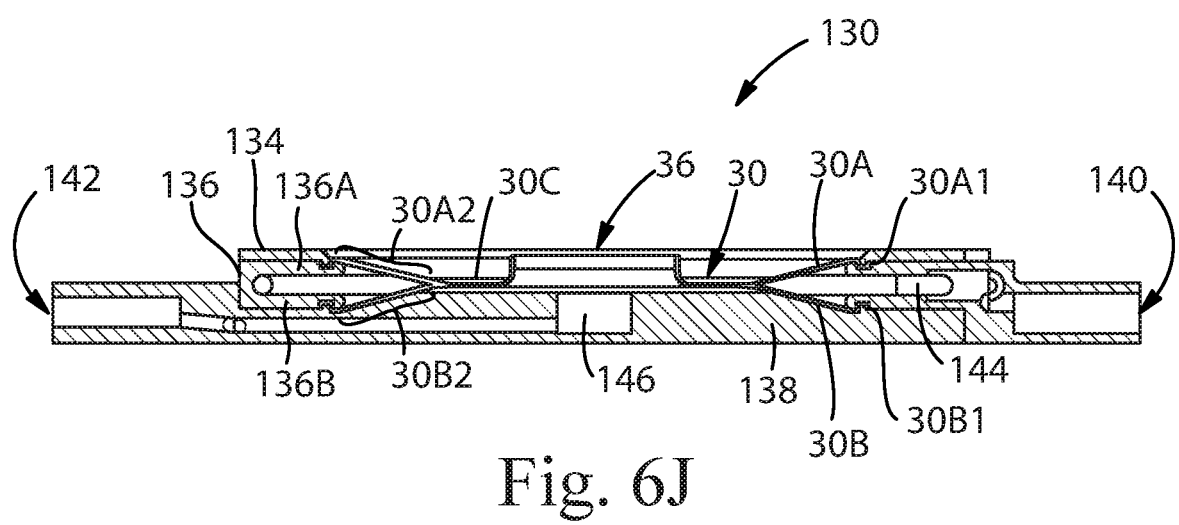
FIG. 6J is a cross-section view of the expanding mechanism shown in FIG. 6I taken along lines 6J-6J.

As shown in FIGS. 6I and 6J, in this embodiment, the retaining members comprising a ring-shaped upper holding member 134, a middle retaining component 136, and a base portion 138. The upper holding member 134, middle retaining component 136, and base portion 138 may comprise portions of the frame 132. The middle retaining component 136 shown in these figures has a sideways oriented U-shaped cross-section where a gap G (also shown at the tip of arrow 144 in FIGS. 6K and 6L) forms the center of the U, and legs of the U are formed by the upper and lower retaining portions 136A and 136B, respectively. The ring-shaped upper holding member 134 is positioned on top of the upper retaining portion 136A for holding portions of the gasket. The lower retaining portion 136B of the middle retaining component 136 is positioned on top of the ring-shaped raised perimeter portion 138A of the base portion 138 for holding other portions of the gasket 30.

The expanding member 130 also comprises a gasket expansion chamber vacuum port 140 for drawing a vacuum to stretch the gasket 30, and an article vacuum chamber port 142 for drawing a vacuum to hold an article to the retaining surface 28. As shown in FIG. 6J, the gasket expansion chamber vacuum port (or simply "gasket vacuum port") 140 is in fluid (or air) communication with the gap G between the upper and lower retaining portions 136A and 136B of the middle retaining component 136. This gap G forms at least part of the gasket expansion chamber 144. The article vacuum chamber port 142 is in fluid (or air) communication with an article vacuum chamber 146 that is located adjacent the retaining surface 28 of this vacuum holder 20.

The extensible gasket 30 is comprised of two layers comprising a first layer, shown as an upper layer 30A and a second layer, shown as a lower layer 30B. The layers 30A and 30B are joined together at the central part 30C of the gasket which surrounds the opening 36. The outer edge portions of the layers are not joined together outside of the central part 30C of the gasket 30 so that they can be gripped by the retaining members of the vacuum holder. More specifically, the upper layer 30A has an outer edge 30A1. The upper layer 30A also has an outer edge portion (or simply "outer portion") 30A2 that is located between outer edge 30A1 of the upper layer 30A and the central part 30C of the gasket. The lower layer 30B has an outer edge 30B1. The lower layer 30B also has an outer edge portion (or simply "outer portion") 30B2 that is located between the outer edge 30B1 of the lower layer 30B and central part 30C of the gasket. The two-layered extensible gasket can be made in any suitable manner including, but not limited to lamination, and molding the two layers as one piece.

The gasket 30 is placed so that the outer portions 30A2 of the upper layer 30A of the gasket 30 are positioned between the upper holding member 134 and the upper retaining portion 136A of the middle retaining component 136. The outer portions 30B2 of the lower layer 30B of the gasket 30 are positioned between the lower retaining portion 136B of the middle retaining component 136 and the raised perimeter portion 138A of the base portion 138. This spaces apart the outer portions 30A2 of the upper layer 30A and the outer portions 30B2 of the lower layer 30B of the gasket and creates a space for vacuum to be drawn therebetween.

The expanding mechanism 130 shown in FIGS. 6I-6M is particularly suitable for use with articles having a non-flat surface by which they are to be held (e.g., non-flat bottom bottles). The elastic gasket 30 engages with the sides of the article above the base of the article. The elastic gasket 30 can engage with the sides of the article any suitable distance above the base of the article (e.g., from about 5 mm to about 20 mm). In the case of plastic bottles where the sides of the bottle are often smoother than the bottoms, this may provide the additional advantage of creating a better seal with the gasket. The expanding mechanism 130 shown in FIGS. 6I-6M is also particularly advantageous because it requires no moving parts.

Figure 6K:
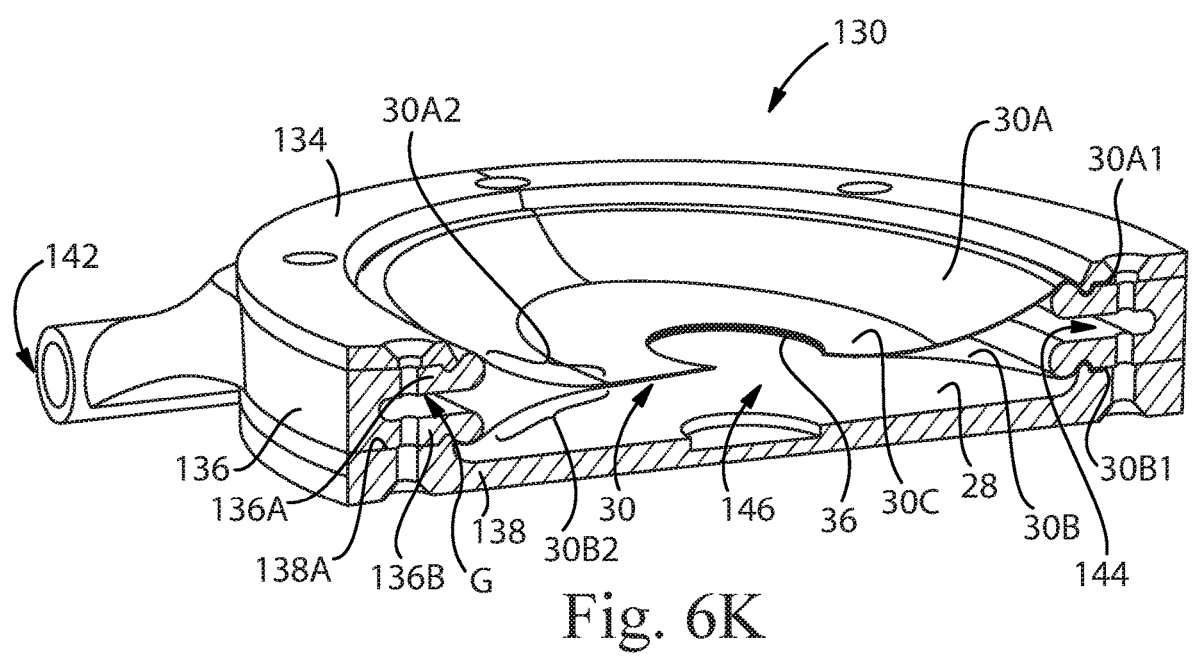
FIG. 6K is a cut-away perspective view of the expanding mechanism shown in FIG. 6I, showing the gasket in a first condition.
Figure 6L:
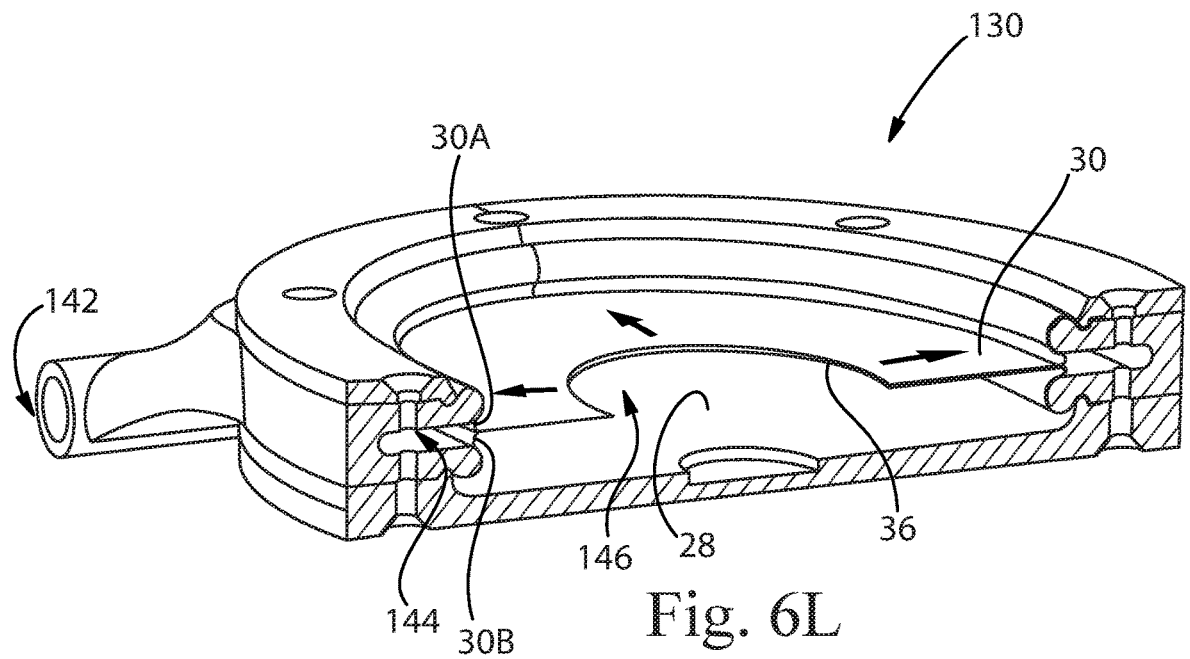
FIG. 6L is a cut-away perspective view of the expanding mechanism shown in FIG. 6I, showing the gasket in a second condition.
Figure 6M:
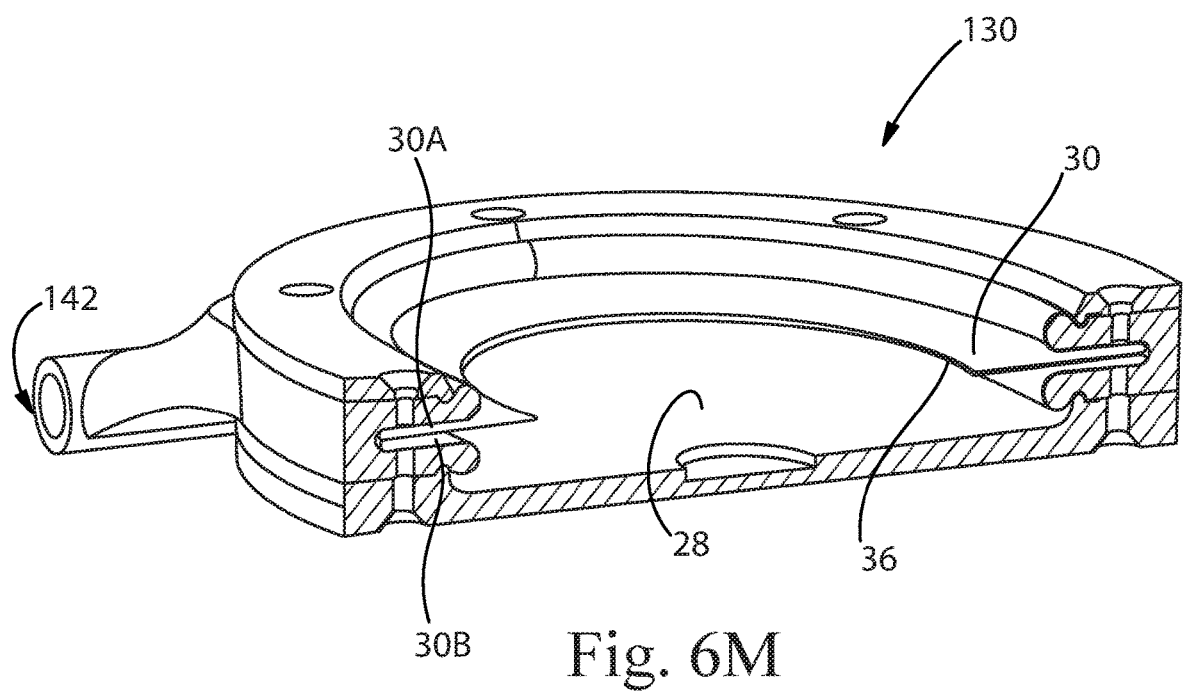
FIG. 6M is a cut-away perspective view of the expanding mechanism shown in FIG. 6I, showing the gasket in a third condition.

In operation, the expanding mechanism 130 shown in FIGS. 6I-6M works as follows. FIG. 6K shows the expanding mechanism 130 without any tension placed on the gasket 30. In a first step, the aperture 36 must be enlarged. To enlarge the aperture 36, the air is evacuated from the gasket expansion chamber 144 by drawing a vacuum through the gasket vacuum port 140. The vacuum draws portions of the gasket 30 into the previously-described gap, which makes the aperture 36 larger. FIG. 6L shows the configuration and size of (one embodiment of) the aperture 36 after tension is exerted on the gasket 30 radially outward in the direction of the arrows to partially extend the gasket 30. FIG. 6M shows the configuration and size of (one embodiment of) the aperture 36 after tension is exerted on the gasket 30 to fully extend the gasket 30.

Next, the base of the article is placed in contact with retaining surface 28, which comprises part of the base 138 of the expanding mechanism 130. The base of the article is placed within the aperture 36 of the gasket 30. The vacuum in the gasket expansion chamber 144 between the upper and lower retaining members 136A and 136B is then released so that the gasket 30 retracts and the portions of the gasket around the aperture 36 fit snugly against the sides of the article. When the vacuum is released, the outer portions of the gasket 30 will return to a configuration similar to that shown in FIG. 6K, and the aperture 36 will take the configuration of the sides of the article that is being held. A vacuum is then drawn through the article vacuum chamber port 142 to draw a vacuum on the base of the article with the article vacuum chamber 146. This vacuum can be retained using a Schrader valve such used in the prior embodiments.

The present invention also relates to the combination of a vacuum holder 20 and an article 10. In one embodiment, the combination of a vacuum holder 20 and article 10 comprises an article 10 having a surface with a concavity therein which is held against the retaining surface 28 of the vacuum holder 20 when the vacuum holder is in its activated configuration, and the concavity in the surface of the article provides the space (vacuum chamber 40) between the surface of an article and the retaining surface 28. In one version of this embodiment, the combination comprises a vacuum holder 20 and an article 10 wherein the article 10 (such as a bottle) has a top optionally provided with an opening and a bottom, and the concavity is in the bottom 14 of the article. In another embodiment, the combination of a vacuum holder 20 and an article 10 is one in which the vacuum holder 20 has a retaining surface 28 with a concavity therein. In this case, the article 10 is held against the retaining surface 28 of the vacuum holder 20 when the vacuum holder 20 is in its activated configuration, and the concavity in the retaining surface 28 of the vacuum holder 20 provides the space for the vacuum chamber 40 between the surface of the article and the retaining surface 28.

The main body 22 of the vacuum holder 20 may be formed of a solid block of material or from one or more pieces of material. Alternatively, the main body 22 may have one or more hollowed out and/or internal portions (or compartments) therein in order to save material and/or weight. The main body 22 can be made from any suitable material(s). Suitable materials include, but are not limited to metals (e.g., stainless steel or aluminum), plastic including thermoplastic or thermoset polymer resins, and composite materials. The main body 22 can be made by any suitable process including, but not limited to injection molding in the case of plastic materials. The main body, or portions thereof, may be produced from a single or multiple kinds of suitable materials by any known additive, subtractive, assembly or combination of manufacturing methods. Materials and manufacturing method selection may be similar, identical, vary or differ between or within portions of the main body 22.

The vacuum holder 20 may be subject to many different uses and may be used in many different processes including, but not limited to production processes which include those in which the article is a container in a filling and capping operation. The vacuum holder 20 may not only be subject to the rough handling of a production line but, additionally, as product is invariably spilled onto the vacuum holder 20 during container filling and capping operations, the vacuum holder 20 may need to be washed. Depending on the nature of the product(s) introduced into the container, washing may require use of hot water and detergents. Thus, it may be desirable for the main body 22 to be impervious to repeated washings with hot water, steam and detergents.

The opposed surface 22B (as shown in FIGS. 1 and 2), which in some cases may form the bottom of the main body 22, may have optional extensions that form "runners" 44 joined thereto and extending therefrom. There can be any suitable number of runners (e.g., two or more). In the embodiment shown in FIGS. 1 and 2, there are four runners in which one runner 44 is located adjacent each corner of the bottom of the main body 22. These runners 44 are useful if the main body 22 is intended to move on a conveyor by sliding the main body 22 on its bottom surface 22B. The runners 44 may be used to stabilize the main body 22 and/or provide other benefits. The runners 44 can be made of the same material as the remainder of the main body 22. In other embodiments, any portion of the bottom of the main body in contact with the conveyor including the entire bottom surface, or the runners, can be made of a low friction material such as TEFLON® impregnated or coated plastic. Alternatively, a low friction material could be applied to (e.g., coated on) such surfaces.

Figure 7:
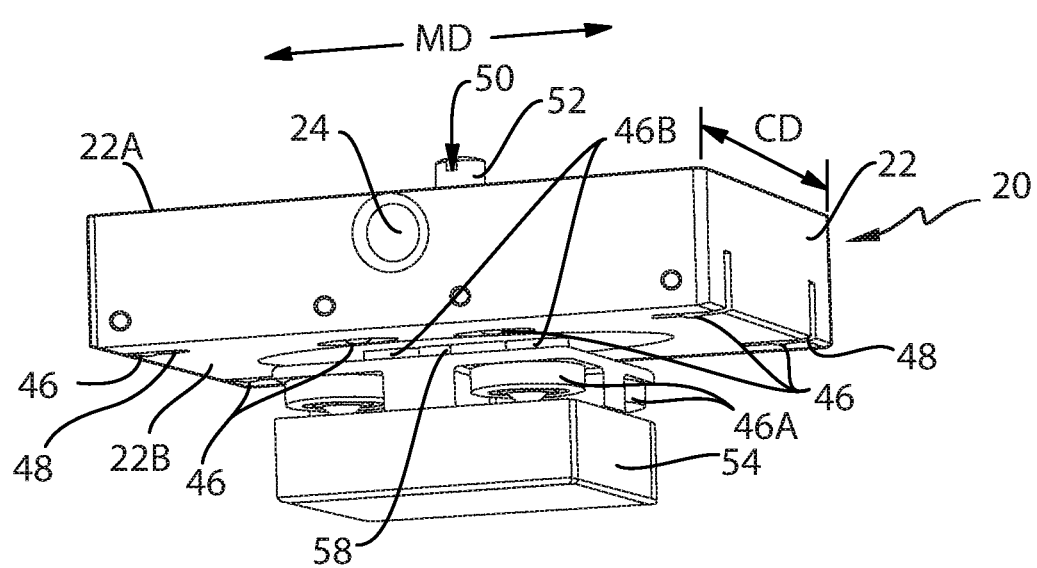
FIG. 7 is a perspective view of a vacuum holder that is provided with wheels and is joined to a component comprising a motive mechanism in order to form a vehicle.

In other embodiments, the friction forces can be reduced by providing wheels, bearings, or other rolling elements on the bottom surface 22B of the main body 22, or on any optional runners 44 thereon. FIG. 7 shows one non-limiting embodiment of a vacuum holder 20 that is provided with wheels 46 on the bottom surface 22B of the main body 22 to facilitate movement of the vacuum holder 20 in the machine direction (MD). The vacuum holder 20 may be provided with any suitable number of wheels 46. Typically, there will be at least two wheels, alternatively at least four wheels 46. In some cases, there may be at least three wheels on each side of the longitudinal centerline of the vacuum holder 20 so that the vehicle can smoothly skip over any breaks in the track surface (such as where pieces of track are joined together). In the particular embodiment shown, the vacuum holder 20 has eight wheels 46 that are vertically oriented in the drawing. The wheels 46 can be joined to the interior or exterior of the main body 22. In the embodiment shown, the wheels 46 are joined inboard of the exterior of the main body 22 in both the machine direction and cross machine direction (CD). More specifically, the wheels 46 are located in recesses 48 on the bottom surface 22B of the main body 22. Any suitable portion of the wheels 46 may be located within the recesses. In the embodiment shown, the wheels 46 are almost entirely within the recesses, except for a portion that is about 10% of the height of the wheels which extends outward from the recesses. Four of the wheels 46 are located adjacent the corners on the bottom surface 22B of the main body 22. The other four wheels 46 are located further inward toward the center of the bottom surface 22B of the main body 22. The wheels 46 can allow the vacuum holder 20 to roll on top of the rails of a track.

In the embodiment shown in FIG. 7, the vacuum holder 20 is joined to a component 54 comprising a motive mechanism in order to form a vehicle. The motive mechanism can comprise any suitable type of mechanism. In the embodiment shown, the motive mechanism comprises a magnet that cooperates with a magnetic track system to propel the vehicle along the track system using electromagnetic force. The component 54 comprising the motive mechanism is joined to the bottom surface 22B of the main body 22 of the vacuum holder 20 by a septum 58 that will lie between the sides of the rails of a track. The septum and/or the component 54 comprising a motive mechanism can have wheels thereon that are horizontally oriented to facilitate movement of the vehicle along the sides of the rails of a track. In the embodiment shown, there are four wheels on the component 54 comprising a motive mechanism that are designated 46A, and two (horizontally-oriented) wheels on the septum 58 that are designated 46B.

The vacuum holder 20 may also comprise an optional top plate 32 joined to the outer surface 22A of the main body 22. The term "joined to", as used throughout this specification, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element.

The main body 22 may comprise a fluid (such as air) passageway 26, or have a fluid passageway associated therewith. The fluid passageway 26 may be located within (or on) the main body 22. The fluid passageway 26 may be formed into the main body 22, or it may be in the form of a separate conduit that runs inside or outside the main body 22. The fluid passageway 26 may extend from the valve 24 to the vacuum port 50. In the embodiment shown in FIG. 2, the fluid passageway 26 passes through at least a portion of the main body 22. In the embodiment, the fluid passageway 26 is located entirely within the main body 22. The fluid passageway 26 initially extends parallel to the longitudinal axis, A, of the valve (and parallel to the retaining surface 28). The fluid passageway 26 then turns (such as by making a right angle) and runs generally perpendicular to the retaining surface 28. The fluid passageway 26 may pass through a hole in the gasket 30, if present, and form an opening or port 50 at the retaining surface 28. In other embodiments, the fluid passageway may be entirely outside the main body 22. For example, the valve can be located in the main body 22, and a flexible hose that acts as the fluid passageway 26 could be connected to a separate plate where the vacuum port is located. In embodiments comprising multiple ports (described below), the fluid passageway 26 could also be a plurality of flexible hoses that are each joined to one of the vacuum ports.

The port 50 may be flush with the retaining surface 28, whether the retaining surface 28 is the outer surface 22A of the main body 22, the top plate 32, or the outer surface of the gasket 30. In other embodiments, the fluid passageway 26 may be part of a structure that forms a protuberance or protrusion 52 so that the port 50 extends outwardly from the retaining surface 28. When the port 50 is described as being located "at" or "along" the retaining surface, it is intended to include embodiments in which the port 50 is flush with the retaining surface 28 (that is, the port is in the retaining surface) as well as those in which the port 50 is in the form of a protuberance that extends outwardly from the retaining surface 28. Providing such a protuberance 52 may be useful in cases in which the portion of the surface of the article being held, such as the bottom 14 of the article 10 is flexible and would tend to be drawn in and collapse by the application of the vacuum. The protuberance 52 ensures that the surface of the article being held (e.g., the bottom of the article) does not collapse when a vacuum is drawn by spacing the retained surface of the article away from the retaining surface 28. This maintains the void space between the retained surface of the article and the retaining surface 28. The port 50 can be of any suitable configuration. In the embodiment shown, the port is in the form of a slit.

The valve 24 may be associated with, or joined to, any portion of the vacuum holder 20 such as the main body 22, in any suitable manner. This includes that the valve 24 may be located on or in any surface of the main body 22, including any side, the bottom, or even the top provided it does not interfere with holding the article or formation of the vacuum chamber 40. The location of the valve 24 may influence the shape, pathway and orientation of the fluid passageway 26. In the embodiment shown in FIGS. 1-3, the main body 22 may comprise a recess for the valve 24. The recess for the valve 24 may be located on any suitable surface of the main body 22 including the outer surface 22A, the opposing surface 22B, and the sides 22C. In other embodiments, the valve 24 need not be located in a recess, but instead joined to the main body 22. For example, the valve 24 may be joined to the outside of the main body 22.

The valve 24 can be any suitable valve that is capable of being repeatedly opened and closed, and while in the closed position is capable of maintaining an at least partial vacuum between the vacuum holder 20 and the surface of the article 10 that is held by the vacuum holder 20. Example valves include: a Schrader valve, a check valve, a butterfly valve, and a Presta valve also known as a French valve. In some embodiments, the valve 24 is a check valve (that is, a "one way valve" that allows fluid, such as air, to flow through it in only one direction). The check valve, in the form of a ball valve or a ball-spring check valve, may be of a type that allows vacuum to be quickly drawn with an activating tool and then quickly sealed, thus allowing the vacuum holder 20 (and article 10 held thereby) to be untethered from a vacuum source.

In some embodiments, the valve 24 may be a Schrader valve. A Schrader valve is a well-known type of valve that is commonly used on car tires. However, the use of such a valve in the manner described herein is not believed to be known. The Schrader valve allows for the two-way flow of air and provides the convenient activating and sealing mechanism described above. The Schrader valve comprises an externally threaded hollow cylindrical (typically metal) tube having an axis and a pair of ends comprising a first end and a second end. In the center of the first end, a metal pin is oriented along the axis of the tube. The pin is normally in a spring-loaded closed position, and the pin can be pushed to open the valve. Air can be both removed and let back in with the same valve by activating the pin at the appropriate time. If desired, the valve housing can be modified to make it smaller. The valve 24 can be joined to the main body 22 and be in fluid (e.g., air) communication with the air passageway 26. The pin for opening the valve is accessible from the side opposing the air passageway 26 associated with the holder. The main body 22 may be configured so that the valve 24 is either permanent or replaceable.

Numerous alternative embodiments of the valve 24 are possible. For example, in some embodiments, more than one valve can be used. For instance, one valve can be in fluid communication with the air passageway 26, and be used to draw a vacuum, and another valve which is also in fluid communication with the air passageway 26 can be used to open the air passageway 26 to let air in so that a vacuum is no longer present. The two valves may be of the same type or may be different from each other.

The top plate 32 can be used for any suitable purpose including, but not limited to: covering any cavities that were formed in the main body 22 (for the purposes of weight reduction or material savings; or, to cover unneeded ports) and/or facilitating joining the vacuum holder 20 to another component. The top plate 32 may span, including the optional joining of, two or more vacuum holders, for example to make a tandem pair of vacuum holders that can move or convey as a unit. The two or more vacuum holders joined together by a top plate may be done so in a separable manner or in a more permanent arrangement, utilizing, for example, mechanical or chemical (e.g. adhesive) elements. An O-ring 34 may be provided to prevent air from leaking into the vacuum chamber 40. The O-ring may be in any suitable location. In the embodiment shown in FIG. 2, the O-ring 34 is located between the top plate 32 and the outer surface 22A of the main body 22. In this embodiment, the O-ring 34 surrounds the base of the extension 52 of the main body in which the vertical portion of the passageway 26 is formed that leads to the port 50. Positioning the O-ring 34 at this location prevents air from entering the vacuum chamber 40 through any gaps between the top plate 32 and the main body 22 and releasing the partial vacuum in the vacuum chamber 40.

In other embodiments, as shown in FIG. 4 (and the following embodiments), the vacuum holder 20 may comprise fewer elements than those described above. For instance, one or more of the top plate, gasket, and O-ring can be eliminated. For example, the top plate can be eliminated, and the gasket 30 can rest directly on the main body 22. In other embodiments, the top plate, gasket, and O-ring can all be eliminated.

Figure 8:
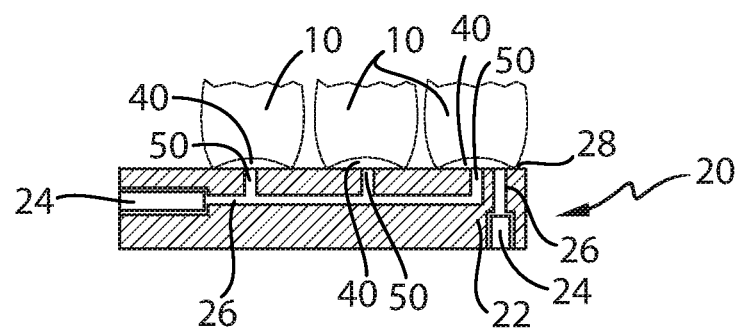
FIG. 8 is a schematic cross-sectional view of another embodiment of a vacuum holder which is capable of holding multiple articles.

Numerous alternative embodiments of the vacuum holder 20 are possible. The vacuum holder 20 is shown in FIG. 3 as supporting an article. The vacuum holder 20 is, however, not limited to supporting a single article. The vacuum holder 20 can be of a size and configuration suitable for holding any desired number of articles (e.g., two, three, four, or more articles). As shown in FIG. 8, the vacuum holder 20 can, thus, hold a plurality of articles. The vacuum holder 20 shown in FIG. 8 has a retaining surface 28 and an air passageway 26 in the form of a manifold with branches leading to portions of the retaining surface 28 associated with each article 10.

The vacuum holder 20 may, as shown in FIG. 8 comprise more than one port 50. The multiple ports 50 are in fluid communication with a fluid passageway 26. The multiple ports 50 may connect to the same vacuum chamber 40 or to different vacuum chambers 40 associated with one or more articles 10. In another example, a fluid passageway 26 may lead to three ports 50, wherein there are two vacuum chambers 40. One port 50 may be associated with one vacuum chamber and the other two ports 50 may be associated with a different vacuum chamber. To accommodate fluid communication with the multiple ports 50, the fluid passageway 26 may comprise, for example, a more voluminous volume such as a cavern-like or reservoir-like volume; or, a branched passage structure. As described earlier, the retaining surface 28 may comprise a gasket 30. The retaining surface 28 may also comprise multiple gaskets 30 each associated with at least one port and one vacuum chamber. In addition, for a vacuum holder 20 that comprises multiple N number of ports 50, when, unneeded, at least one up to N−1 ports may be capped, plugged or covered for the purpose of preventing fluid communication between the environment and the fluid passageway 26, especially when the fluid passageway is under at least a partial vacuum.

The vacuum holder 20 may, as shown in FIG. 8, include more than one fluid passageway 26 wherein each fluid passageway 26 connects to at least one valve 24 and at least one port 50.

When the vacuum holder is in the untethered activated state, one to all of the fluid passageways 26 may be under vacuum. For multiple fluid passageways 26 which are under vacuum, they may all be at the same vacuum level, given normal manufacturing variations. Alternatively, two or more of the fluid passageways 26 may have different levels of vacuum when compared at least one other fluid passageway of the activated vacuum holder 20. Example differences of vacuum between any two fluid passageways 26 include greater than or equal to 0.1 psi (0.7 kPa), alternatively 0.5 psi (3 kPa), and alternatively 1 psi (7 kPa).

The different activated fluid passageways 26 may be utilized to hold different articles, or to hold the same article at the same or multiple vacuum chambers 40, or a combination of these scenarios. If at least one of the fluid passageways 26 is unneeded to maintain at least a partial vacuum when the vacuum holder 20 is activated, then the valves 24 associated with the unneeded fluid passageways 26 may be opened to release any vacuum present. Further, during vacuum charging of the vacuum holder 20, the valves of the unneeded air passageways 26 are not open for the purpose of drawing a vacuum.

Figure 9:
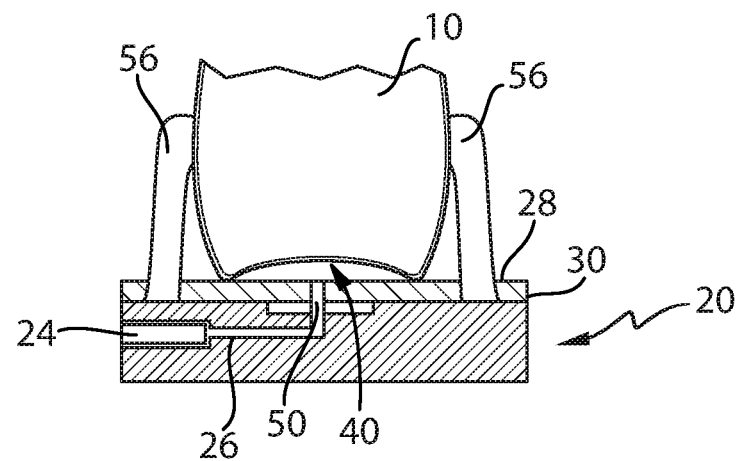
FIG. 9 is a schematic side view of an embodiment of a vacuum holder having a pair of holding features thereon.

The vacuum holder 20 may be provided with one or more additional holding features 56 as shown in FIG. 9 if it is desired to convey bottles with non-flat or convexly-rounded bottoms that would be unstable on a horizontal surface, or bottles with small bases that will easily tip. The one or more holding features may be in continual contact with the article, or they may be in the near vicinity of the article but only contact the article in certain situations such as during vehicle acceleration or deceleration force experienced by the article wherein the holding feature provides additional anti-tipping function when contacted.

Figure 10:
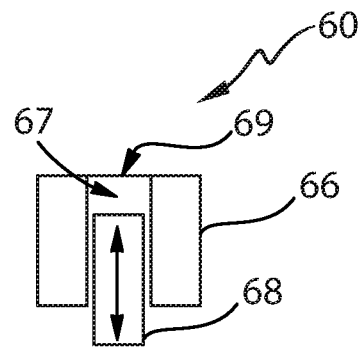
FIG. 10 is a schematic cross-sectional view of an alternative embodiment of a vacuum source.

As shown in FIG. 4, a vacuum source 60 will typically be used in conjunction with the vacuum holder 20. The vacuum source 60 can be used to draw an at least partial vacuum in the void space or vacuum chamber 40 between the retaining surface 28 of the vacuum holder 20 and the surface of the article to be held. Any suitable type of vacuum source can be used. One suitable type of vacuum source 60 is a vacuum pump. The vacuum pump 60 can have a hose 62 joined thereto, and a tool 64 at the distal end of the hose 62 for fitting into or onto the valve 24. FIG. 10 shows an alternative type of vacuum source 60 in the form of a piston-type device. This piston-type device 60 comprises a housing 66 having a chamber 67 with a movable piston 68 therein. When the piston 68 slides as shown, a vacuum can be drawn at the opening 69 of the device 60.

Figure 11:
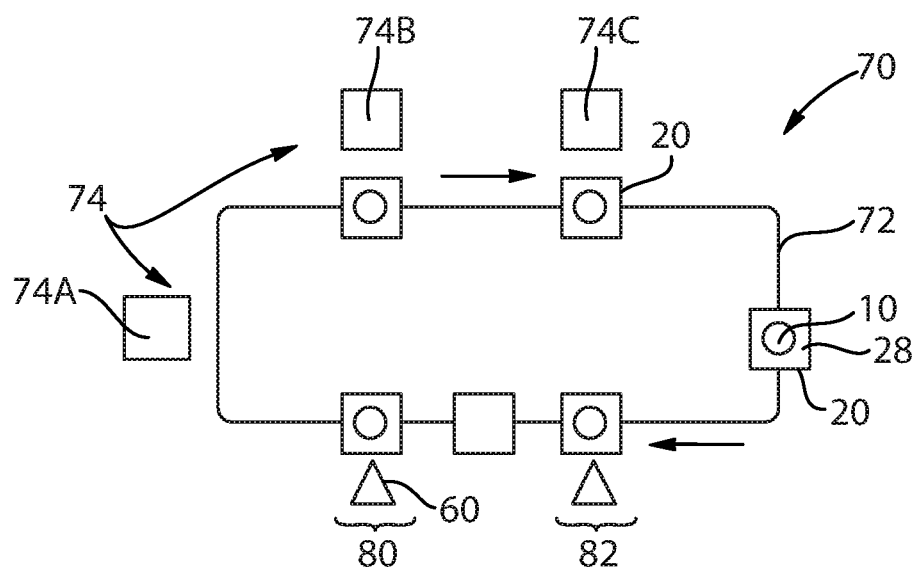
FIG. 11 is a schematic plan view of one non-limiting embodiment of a system and method for holding and conveying articles.

The vacuum holder 20 can be used for numerous different purposes. In some cases, the vacuum holder 20 can be used in a system 70 for holding and conveying articles. As shown in FIG. 11, one non-limiting embodiment of the system 70 comprises an article conveyor 72 that conveys at least one article 10 past at least one station 74 for performing an operation on the article. If there is more than one station, they can be designated by reference numbers 74A, 74B, 74C, etc. If the system 70 is part of a bottle processing operation, the stations 74 may, for example, comprise a bottle filling station 74A, a decorating (e.g., labeling) station 74B, and a capping station 74C.

The term "conveyor", as used herein, refers to devices that move articles generally, and is not limited to conveyor belts. The conveyor 72 can be any suitable type of conveyor. Suitable types of conveyors include, but are not limited to: endless loop conveyors, which may be in the form of tracks, belts, chains, and the like, and magnetic servo car conveyors.

In one embodiment, the conveyor 72 may be physically-guided track, guided by fixed or limited movement floor tracks, side rails, etc., upon which one or more wheel-equipped vacuum holders 20 may travel, and be moved by an on-board motive mechanism such as a motor to drive at least one of the wheels. To supply the motor with energy, the vacuum holder may comprise an on-board storage battery or capacitor supplying at least part of the vacuum holder with power. The storage battery or capacitor can be recharged at any desired time and position, examples include during routine maintenance, downtime of the individual vacuum holder, vacuum activation or deactivation or at certain points of travel or temporary rest on the physically-guide track. Recharging may occur by physical conductor connection to a power-charging source, or may be accomplished inductively for a vacuum holder equipped with the proper induction receiver coil. Alternatively, the vacuum holder's battery may be periodically removed from the vacuum holder and replaced with a charged battery replacement.

In other embodiments, the conveyor 72 may be a linear synchronous motor system, such as the MAGNEMOVER® LITE intelligent conveyor system. The MAGNEMOVER® LITE intelligent conveyor system, and the components thereof, are described in U.S. Pat. Nos. 6,011,508; 6,101,952; 6,499,701; 6,578,495; 6,781,524; 6,917,136; 6,983,701; 7,448,327; 7,458,454; and 9,032,880. Such a conveyor utilizes carriers that are propelled by the principle of linear synchronous motor technology on a guideway, and electronics control the motion of the carriers. The carriers can be moved and accelerated individually irrespective of the propulsion system. In such a case, the vacuum holder 20 may either comprise a magnetic flux source or be joined to a vehicle comprising a magnetic flux source. If the vacuum holder 20 is joined to a vehicle comprising a magnetic flux source, in one embodiment as shown in FIG. 7, the vacuum holder 20 described herein can form a portion of a vehicle that moves on top of the guideways of such a conveyor system. In such case, the vacuum holder 20 can be joined at a septum portion 58 to a second portion 54 of the vehicle that is located below a guideway, wherein the second portion of the vehicle comprises the magnetic flux source.

The conveyor 72 may move (and, thus, move the vacuum holders 20 and articles 10) in a linear path; a curvilinear path such as a circular path; or in a path that comprises both linear portions and curvilinear portions. Non-limiting examples of the latter paths include: elliptical paths, race track configured paths (FIG. 11), and other closed loop paths. The conveyor 20 may also have one or more side tracks joined thereto for diverting one or more vacuum holders 20 and/or articles 10 for any desired purpose.

The system and apparatus 70 shown in FIG. 11 is described as a plan view. In this case, the retaining surfaces 28 of the vacuum holders 20 are oriented horizontally and the articles 10 rest on top of the vacuum holders 20. However, the entire apparatus 70 can be reoriented so that the retaining surfaces 28 are vertical, in which case FIG. 11 would be a side elevation view. In other embodiments, the system and apparatus 70 can be oriented in any configuration between horizontal and vertical. In addition, due to the strong holding force that can be exerted on the articles by the vacuum holders 20, it is even possible for at least a portion of the apparatus to be oriented so that the retaining surfaces 28 of the vacuum holders 20 are oriented horizontally and the articles 10 are held upside down by the vacuum holders 20 with the retaining surface 28 facing downward. Of course, if the articles 10 are containers to be filled with liquids, the filling would likely take place in a conventional gravity filling orientation with the articles 10 resting on top of the vacuum holders 20.

The vacuum source 60 for charging the vacuum holders 20 may be located at a vacuum station, designated generally by reference number 80. There may be one or more vacuum stations 80 located at any suitable place(s) along the conveyor 72. The individual vacuum stations can be labeled 80A, 80B, etc. Any suitable device/vacuum source 60 (such as those described above) that is capable of temporarily connecting to a vacuum holder 20 and drawing a vacuum may be located at the vacuum station 80. The vacuum source 60 at the vacuum station 80 may comprise a vacuum pump having a hose one end of which is joined to the vacuum pump. A vacuum tool, such as a nozzle, can be joined to the other end of the hose, and the nozzle may have a quick connect coupling similar to a gas station tire pump so that after the vacuum is drawn, the valve on the vacuum holder 20 may be closed to retain the vacuum.

The system and apparatus may also comprise a vacuum release device that is located at a vacuum release station 82. The vacuum release station 82 may be located any suitable place(s) along the conveyor 72 where it is desired to open a valve and let air into the void space 40 in order to release the article 10 from attachment to the vacuum holder 20. The vacuum release device can be a device that is configured to only open a valve. In other cases, the vacuum release device can comprise part of a combined vacuum source and vacuum release device. For example, the vacuum source or other device at a vacuum station 80 can be configured to: draw a vacuum on the vacuum holder 20; close a valve to retain the vacuum; and, when it is desired to release the vacuum, open the valve on the vacuum holder 20 to release the vacuum.

In such a process, at least one article 10, such as a bottle, is initially brought into contact with the retaining surface 28 of the vacuum holder 20 so that the surface of the article 10 to be held by the vacuum holder 20 is aligned with and in contact with the retaining surface 28 of the vacuum holder 20. This can be done by moving the article 10, the vacuum holder 20, or both. This can be done manually, statically such as by a gravity feed chute with optional gate, or with a mechanical motion device. Suitable mechanical motion devices include, but are not limited to: independently actuatable automatic arms, pneumatic arms, robots, transfer wheel, and other mechanical moving elements. In the embodiment shown in FIG. 11, where the retaining surfaces 28 of the vacuum holders 20 are horizontally-oriented, the bottles 10 are placed onto the retaining surfaces 28 of the vacuum holders 20.

Next, a vacuum tool "activates" the vacuum holder 20 and draws vacuum on the bottom of the bottle. Vacuum is applied to the holder with a "vacuum tool" (with a bottle in place) and then once the tool is removed the valve 24 maintains vacuum between the vacuum holder 20 and the surface of the article (e.g., the bottom of the bottle). The vacuum holder 20, thus, has an activated configuration wherein the void space between the surface of the article 10 and the retaining surface 28 of the vacuum holder 20 has air evacuated therefrom to create an at least partial vacuum therein. The valve 24 can be closed to retain the vacuum and hold the surface of an article 10 against the retaining surface 28 of the vacuum holder 20. The passageway 26 between the valve 24 and the retaining surface 28 will also be at (or near) the at least partial vacuum. The vacuum tool is removed (the vacuum holder 20 is, thus, untethered) and then the vacuum holder 20 and bottle 10 may be conveyed on the conveyor 72. When it is desired to remove the article 10 from the vacuum holder 20 such as to send the article 10 to another step or operation in the process, the vacuum can be released by opening the valve 24 (or a separate valve) and allowing air to enter the vacuum chamber 40. The vacuum holder 20 has an unactivated configuration when the vacuum is released. In the unactivated configuration, the pressure is atmospheric or ambient, and the air passageway between the valve and the retaining surface is at (or near) the ambient or atmospheric pressure.

The articles 10 may be conveyed without separating from the holder 20 (e.g., falling off a horizontally-oriented platform) at up to certain velocities and accelerations. For example, bottles capable of holding between 9 and 40 oz. (266 milliliters to 1.2 liters) of liquid do not fall off vacuum holders that form horizontal platforms at up to 2 m/s, or more, peak velocity and 2 m/s$^2$, or more, acceleration. The vacuum holder 20 is also capable of maintaining a vacuum for an extended duration, which is well in excess of the period of time an article will typically remain on a conveyor in a manufacturing process.

The vacuum holders 20 may have an optional vacuum gauge joined thereto to verify that the vacuum level is not changing from a desired setpoint. Suitable setpoints may vary depending on the article being held. For example, a much lower partial vacuum is needed to hold and stabilize (during vehicle movement) a light article, such as a bottle cap, than is necessary to hold and stabilize a heavier article, such as large bottle filled with fluent material. For holding light articles, a partial vacuum of −1 psig (−7 kPa) may be suitable. For holding larger and/or heavier articles, the set point can range up to a partial vacuum of −13 psig (−90 kPa) or of −14 psig (−96 kPa), up to a perfect vacuum (−14.7 psig (−100 kPa)). The vacuum holder set point can be any amount of partial vacuum within these ranges (or greater than or equal to the following amounts) including, but not limited to: −2 psig (−14 kPa), −3 psig (−21 kPa), −4 psig (−28 kPa), −5 psig (−34 kPa), −6 psig (−41 kPa), −7 psig (−48 kPa), −8 psig (−55 kPa), −9 psig (−62 kPa), −10 psig (−69 kPa), −11 psig (−76 kPa), −12 psig (−83 kPa), or any range between any of the set points described herein. The statement "greater than or equal" conveys that an equal or increased (i.e. greater) vacuum is present with an activated configuration. For example, the statement "at least partial vacuum which is greater than or equal to −2 psig (−14 kPa) includes activated configuration partial vacuums of −3 psig (−21 kPa), −4 psig (−28 kPa), −5 psig (−34 kPa), −6 psig (−41 kPa), −7 psig (−48 kPa), −8 psig (−55 kPa), −9 psig (−62 kPa), −10 psig (−69 kPa), −11 psig (−76 kPa), −12 psig (−83 kPa), −13 psig (−90 kPa), or −14 psig (−96 kPa), up to a perfect vacuum (−14.7 psig (−100 kPa)). The vacuum holder 20 vacuum level can stay at setpoint for more than two weeks. It is believed that the Schrader valve is capable of holding a perfect vacuum.

The vacuum holder 20 can be provided with various additional optional features. The vacuum holder 20 vehicles (or "carriers") may be provided with noise reducing bumpers in the event one vacuum holder carrier collides with another vacuum holder carrier, or with some other object. The vacuum holder 20 can be provided with a tracking device such as an RFID tag to identify when the vacuum holder passes a known position. The vacuum holder 20 can be provided with an on-board vacuum/pressure sensor which can measure the pressure in the void space 40 and visually or electronically communicate the same to a human observer, or to a device such as a part of a control system.

The optional vacuum gauge may be operably joined to sensor and/or communication means so that any decrease in the vacuum may result in a notification to any operator or operating system that the vacuum has decreased. This notification can be linked to any of the set points outlined above and may result in a subsequent operation to refresh the vacuum. This notification can be made by any known communication means including both wired and wireless communication means. This notification may result in the holder be routed to a portion of the path where the vacuum may be recharged or to an inspection and/or reject station where the integrity of the holder can be checked and/or corrected.

The system 70 may also be provided with various additional optional features. Other types of operations that can be performed on a container and/or its contents include: loading, dispensing, mixing, sealing, emptying, unloading, heating, cooling, pasteurizing, sterilizing, wrapping, rotating or inverting, printing, cutting, separating, pausing to allow mechanical settling or mechanical separation or chemical reaction, or etching. In addition, such operations may include one or more inspections, including any of the following: scanning, weighing, detecting the presence or orientation of a container, or other types of inspection.

The vacuum holder 20 can also be subjected to a cleaning or other operation. For example, the system 70 may provide a washing, brushing, or blow-off operation. Such a cleaning operation can be provided at any suitable location in the system. For example, after an article such as a bottle has all the desired operations performed thereon, and is unloaded from the vacuum holder 20, and prior to loading the vacuum holder 20 with another article, a blow-through of the passageway 26 could be used to clean out the passageway 26 of any spilled contents. In another example, at unloading or loading, the pressure or dynamic back pressure of air passing through the passageway 26 could be measured to determine if the vacuum holder's passageway 26 has a partial or complete restriction (due to soiling debris).

The vacuum holder 20, system, and method described herein may provide a number of advantages. It should be understood, however, that such advantages are not required to be present unless set forth in the appended claims. The vacuum holder 20, system, and method are capable of holding and/or conveying articles of a wide variety of shapes and sizes. The vacuum holder 20 may, unlike pucks, provide nearly full exposure of the top and sides of articles since the article (such as a bottle) may be only held substantially from the bottom. As a result, all other surfaces are unobstructed so decorations such as labels, stickers, shrink sleeves, etc. can be applied to these surfaces while any opening in the top (or any side) is free for a filling operation. The vacuum holder 20 may also operate with no external connections being required to supply vacuum. The vacuum holder 20 is, therefore, "untethered" allowing it to move freely around a conveyor.

The vacuum holder 20 also has several advantages over suction cups. This vacuum holder 20 is suitable for adhering to surfaces having a variety of different curvatures and/or surface features. Suction cups typically have a certain diameter, and are not suitable for holding articles having dimensions smaller than their diameter. Suction cups create a void space that is fixed, and is defined by the dimensions of the suction cup. The vacuum holder, on the other hand, can accommodate variable void spaces, and can apply adjustable levels of vacuum. It is typically not possible to adjust the level of vacuum created by suction cups. Suction cups typically do not have a high level of structural rigidity, and if a suction cup is holding an article that is subject to acceleration, the force of the acceleration may cause the suction cup to lose its grip on the article. The vacuum holder 20 only requires the opening and closing of a valve to draw and release a vacuum, and does not require any manipulation of a suction cup or mechanism attached thereto.

Test Methods 1-1. Sample Preparation for Tensile and Hysteresis Tests

The direction in which the elastic material will stretch in its intended use is considered the primary stretch direction of the material. For standalone materials, where the primary stretch direction is not known, the direction in which the material has greatest extensibility is assumed to be the primary stretch direction. A set of rectilinear specimens at least 30 mm long in the primary stretch direction, and 25.4 mm wide (W) in the perpendicular direction is cut from the material. The width "W" can be within 10% of 25.4 mm. The three specimens are cut from the same portion of identical materials for each set. The basis weight of each material specimen is measured. If the difference in the elastic material specimen basis weight is more than 10% between highest and lowest basis weight samples for any set, then specimens are re-collected for that set from a different part of the material, or from fresh products. Each set is analyzed by the methods described below. For the Tensile Test and Hysteresis Test, the direction in which specimen has longer dimension is considered the specimen direction of stretching.

1-2. Specimen Weight and Basis Weight

Each specimen is weighed to within ±0.1 milligram using a digital balance. Specimen length and width are measured using digital Vernier calipers or equivalent to within ±0.1 mm. All testing is conducted at 22±2° C. and 50±10% relative humidity. Basis weight is calculated using equation below.

$$\text{Basis Weight}\left(\frac{g}{m^2}\right) = \frac{\text{(Weight of the specimen in grams)}}{\text{(Length of the specimen in meter)} \text{(Width of the specimen in meter)}}$$

1-3. Tensile Test Setup

A suitable tensile tester interfaced with a computer such as MTS model Alliance RT/1 with TestWorks 4® software or equivalent is used. The tensile tester is located in a temperature-controlled room at 22° C.±2° C. and 50±10% relative humidity. The instrument is calibrated according to the manufacturer's instructions. The data acquisition rate is set to at least 50 Hertz. The grips used for the test are wider than the sample. Grips having 50.8 mm width may be used. The grips are air actuated grips designed to concentrate the entire gripping force along a single line perpendicular to the direction of testing stress having one flat surface and an opposing face from which protrudes a half round (radius=6 mm, e.g. part number: 56-163-827 from MTS Systems Corp.) or equivalent grips, to minimize slippage of the specimen. The load cell is selected so that the forces measured are between 10% and 90% of the capacity of the load cell used. The initial distance between the lines of gripping force (gauge length) is set at 25.4 mm. The load reading on the instrument is zeroed to account for the mass of the fixture and grips.

The specimen is mounted into the grips in a manner such that there is no slack and the load measured is between 0.00 N and 0.02 N. The specimen is mounted in the center of the grips, such that the specimen direction of stretching is parallel to the applied tensile stress.

1-4. Tensile Test

The instrument is set up and the specimen mounted as described in the Tensile Test Setup above. The tensile test is initiated and the specimen is extended at 254 mm/min, with a data acquisition rate of at least 50 Hertz, until the specimen breaks, typically 500–1500% strain. The % strain is calculated from the length between grip lines L, and initial gauge length, $L_0$, as illustrated in FIG. 1, using the following formula:

$$\% \text{ Strain} = \frac{(L - L_0)}{L_0} \times 100$$

Three specimens of each set are measured, and the arithmetic average of stress at 100% strain (MPa), stress at 200% strain (MPa), stress at break (also called Tensile Strength, MPa), and % Strain at break are recorded. % Strain at break is defined as the % Strain at peak force.

Stress in MPa is calculated as follows: Stress=[measured force]/[specimen cross-sectional area].

Specimen cross-sectional area is calculated from specimen weight, Wt (g); before straining specimen width, W (mm); and density of the material, $\rho$ (g/cm$^3$). Specimen cross-sectional area $A_0$ (mm$^2$) is given by formula: $A_0 = [Wt \times 10^3]/[\rho \times W]$.

1-5. Hysteresis Test

The instrument is set up and the specimen mounted as described in the Tensile Test Setup section above. Data acquisition rate is set to at least 50 Hertz.

The Hysteresis Test method for material specimens involves the following steps (all strains are % strains):

(1) Strain the specimen to 50% strain at a constant crosshead speed of 25.4 cm per minute.

(2) Hold specimen at 50% strain for 30 seconds.

(3) Go to 0% strain at a constant crosshead speed of 25.4 cm per minute.

(4) Hold specimen for 1 minute at 0% strain.

(5) Pull the specimen to 0.05 N force and return to 0% strain with no hold time.

The Specimen length at 0.05 force in step (5) is recorded and used to calculate the % set in the material as below.

% Set=((Length at 0.05 N force−Original Gauge length)/Original Gauge length)×100.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "90°" is intended to mean "about 90°".

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A vacuum holder, wherein said vacuum holder has a retaining surface for holding an article against said retaining surface by vacuum, said vacuum holder comprising:
   a main body having an outer surface, said main body having at least one air passageway associated therewith leading to a vacuum port at said retaining surface; and
   an elastically extensible gasket adjacent at least a portion of the outer surface of the main body, wherein said gasket has an opening therein, wherein when said gasket is stretched and relaxed, said opening is sized and configured for fitting around the portion of the surface of the article to be held against the retaining surface of the vacuum holder and at least some portions of the article adjacent thereto, wherein said gasket forms a skirt around the portion of the surface of the article to be held against the retaining surface of the vacuum holder and at least some portions of the article adjacent thereto, wherein at least one of the retaining surface and the surface of the article is configured to provide a void space between the surface of an article and the retaining surface, and said vacuum holder has:
an activated configuration wherein said void space has at least partial vacuum therein, and
an unactivated configuration when the vacuum is released.

2. The vacuum holder of claim 1 wherein said gasket has a volcano-shaped configuration.

3. The vacuum holder of claim 1 further comprising an expanding mechanism for stretching and relaxing said elastically extensible gasket.

4. The vacuum holder of claim 3 wherein said expanding mechanism comprises a plurality of pistons with clamps joined thereto, wherein said clamps are configured to grip a portion of the extensible gasket, and the pistons are configured to move outward away from the opening in the gasket to stretch the gasket.

5. The vacuum holder of claim 3 wherein said expanding mechanism extends and relaxes said elastically extensible gasket by drawing a vacuum on portions of said gasket and then releasing said vacuum.

6. The vacuum holder of claim 5 wherein the gasket has outer edges and a central portion surrounding the opening in the gasket, and said gasket comprises a first layer and a second layer wherein said layers are joined together in said central portion of the gasket and not joined outside of said central portion so that outer portions of said layers between said central portion and the outer edges of the gasket are not joined.

7. The vacuum holder of claim 6 wherein said vacuum holder is configured to grip portions of said outer portions of said layers so that the outer portions of the layers are spaced apart to create a space for a vacuum to be drawn therebetween.

8. A combination of a vacuum holder of claim 1 and an expanding mechanism for stretching and relaxing said elastically extensible gasket, wherein said vacuum holder is brought into proximity of said expanding mechanism, said expanding mechanism is configured to grip portions of said extensible gasket and extend and relax the same.

9. A method for holding an article using a vacuum holder, said method comprising:
a. providing an article, said article having a surface, wherein a portion of said article surface is to be held by a vacuum holder;
b. providing a vacuum holder, said vacuum holder having a retaining surface for holding an article against said retaining surface by vacuum, said vacuum holder comprising:
a main body having an outer surface, said main body having at least one air passageway associated therewith leading to a vacuum port at said retaining surface; and
an elastically extensible gasket overlying the outer surface of said main body, wherein said gasket has a hole, wherein when said gasket is stretched and relaxed, said hole is sized and configured for fitting around the portion of the surface of the article to be held against the retaining surface of the vacuum holder, wherein at least one of the retaining surface and the surface of the article is configured to provide a void space between the surface of the article and the retaining surface, wherein said vacuum holder has:
an activated configuration wherein said void space has at least partial vacuum therein, and
an unactivated configuration when the vacuum is released
c. stretching said elastically extensible gasket so that said hole is larger than said portion of said article surface to be held by vacuum;
d. placing said article onto the outer surface of said vacuum holder so that said portion of the surface of said article to be held by vacuum is positioned over said vacuum port of said vacuum holder and said portion of the surface of said article is inside the hole in said gasket;
e. releasing the forces extending said gasket so that portions of said gasket adjacent said hole contact said article and fit snugly against said article; and
f. drawing a vacuum on the article.

* * * * *